United States Patent
Layland et al.

(10) Patent No.: US 7,923,668 B2
(45) Date of Patent: *Apr. 12, 2011

(54) ACOUSTIC NACELLE INLET LIP HAVING COMPOSITE CONSTRUCTION AND AN INTEGRAL ELECTRIC ICE PROTECTION HEATER DISPOSED THEREIN

(75) Inventors: Michael John Layland, Bonita, CA (US); Keith Towers Brown, Bonita, CA (US); Claude Marc Hubert, Riverside, CA (US); Daniel P. Christy, Akron, OH (US)

(73) Assignee: Rohr, Inc., Chula Vista, CA (US)

( * ) Notice: Subject to any disclaimer, the term of this patent is extended or adjusted under 35 U.S.C. 154(b) by 944 days.

This patent is subject to a terminal disclaimer.

(21) Appl. No.: 11/733,628

(22) Filed: Apr. 10, 2007

(65) Prior Publication Data

US 2008/0179448 A1    Jul. 31, 2008

Related U.S. Application Data

(63) Continuation-in-part of application No. 11/276,344, filed on Feb. 24, 2006, now Pat. No. 7,291,815.

(60) Provisional application No. 60/791,967, filed on Apr. 14, 2006.

(51) Int. Cl.
*H05B 3/58* (2006.01)
*B64C 1/40* (2006.01)
*B64D 33/02* (2006.01)

(52) U.S. Cl. ........ 219/535; 219/529; 244/1 N; 244/53 B

(58) Field of Classification Search .................. 219/535, 219/529, 201, 211, 520, 542; 244/1 N, 53 B, 244/53 R, 54, 134 R, 134 B, 134 D
See application file for complete search history.

(56) References Cited

U.S. PATENT DOCUMENTS

| 2,152,053 A | 3/1939 | Jenkins |
| 2,496,279 A | 2/1950 | Ely et al. |
| 2,627,012 A | 1/1953 | Kinsella et al. |

(Continued)

FOREIGN PATENT DOCUMENTS

EP    1 495 963 A2    1/2005

(Continued)

OTHER PUBLICATIONS

Extended European Search Report and Opinion (EP Appln. No. 07003782.5) 13 pages, mailed Jan. 13, 2010.

(Continued)

*Primary Examiner* — Geoffrey S Evans
*Assistant Examiner* — Vinod D Patel
(74) *Attorney, Agent, or Firm* — Womble Carlyle Sandridge & Rice, PLLC

(57) ABSTRACT

An engine nacelle inlet lip includes both acoustic treatment and electric heating for ice protection. The inlet lip has a composite outer skin and a composite inner skin, with the composite outer skin having at least one integrated heater element embedded in the composite material. An acoustic cellular core positioned between the outer and inner skin acts to attenuate fan noise from the engine. Covering the outer skin and overlying the acoustic core is a perforated erosion shield having a first set of openings that pass entirely thorough its thickness. The composite outer skin includes a second set of openings such that sound waves can pass from an inner barrel portion of the inlet lip through the erosion shield, outer skin, and heater element to the underlying acoustic cellular core.

25 Claims, 27 Drawing Sheets

U.S. PATENT DOCUMENTS

| | | | |
|---|---|---|---|
| 3,178,560 A | 4/1965 | Mapp et al. |
| 3,266,005 A | 8/1966 | Balde et al. |
| 3,349,359 A | 10/1967 | Morey |
| 3,560,107 A | 2/1971 | Helms |
| 3,800,121 A | 3/1974 | Dean et al. |
| 3,935,422 A | 1/1976 | Barnes et al. |
| 4,021,008 A | 5/1977 | Eichenauer |
| 4,036,457 A | 7/1977 | Volkner et al. |
| 4,062,917 A | 12/1977 | Hill et al. |
| 4,144,473 A | 3/1979 | Almer |
| 4,291,079 A | 9/1981 | Hom |
| 4,443,735 A | 4/1984 | Alexandrov et al. |
| 4,473,740 A | 9/1984 | Ellis |
| 4,485,297 A | 11/1984 | Grise et al. |
| 4,514,619 A | 4/1985 | Kugelman |
| 4,518,851 A | 5/1985 | Oppitz |
| 4,533,821 A | 8/1985 | Sato |
| 4,581,522 A | 4/1986 | Graham |
| 4,585,971 A | 4/1986 | Clegg |
| 4,656,339 A | 4/1987 | Grise |
| 4,737,618 A | 4/1988 | Barbier et al. |
| 4,743,740 A | 5/1988 | Adee |
| 4,814,586 A | 3/1989 | Grise |
| 4,837,618 A | 6/1989 | Kawasaki et al. |
| 4,892,998 A | 1/1990 | Marstiller et al. |
| 4,906,821 A | 3/1990 | Bechevet et al. |
| 4,942,078 A | 7/1990 | Newman et al. |
| 4,972,197 A | 11/1990 | McCauley et al. |
| 5,019,797 A | 5/1991 | Marstiller et al. |
| 5,098,037 A | 3/1992 | Leffel et al. |
| 5,144,113 A | 9/1992 | Hall et al. |
| 5,192,605 A | 3/1993 | Mercuri et al. |
| 5,248,116 A | 9/1993 | Rauckhorst |
| 5,344,696 A | 9/1994 | Hastings et al. |
| 5,356,096 A | 10/1994 | Rauckhorst et al. |
| 5,361,183 A | 11/1994 | Wiese |
| 5,427,332 A | 6/1995 | Rauckhorst et al. |
| 5,453,597 A | 9/1995 | McWilliams |
| 5,475,204 A | 12/1995 | Giamati et al. |
| 5,584,450 A | 12/1996 | Pisarski |
| 5,590,854 A | 1/1997 | Shatz |
| 5,653,836 A | 8/1997 | Mnich et al. |
| 5,657,951 A | 8/1997 | Giamati |
| 5,702,231 A | 12/1997 | Dougherty |
| 5,742,223 A | 4/1998 | Simendinger et al. |
| 5,765,779 A | 6/1998 | Hancock et al. |
| 5,824,996 A | 10/1998 | Kochman et al. |
| 5,826,108 A | 10/1998 | Sonobe |
| 5,925,275 A | 7/1999 | Lawson et al |
| 5,928,549 A | 7/1999 | Hitzigrath |
| 5,934,617 A | 8/1999 | Rutherford |
| 5,942,140 A | 8/1999 | Miller et al. |
| 5,947,418 A | 9/1999 | Bessiere et al. |
| 5,971,323 A | 10/1999 | Rauch et al. |
| 6,013,214 A | 1/2000 | Inukal et al. |
| 6,027,075 A | 2/2000 | Petrenko |
| 6,031,214 A | 2/2000 | Bost et al. |
| 6,054,690 A | 4/2000 | Petit et al. |
| 6,094,907 A | 8/2000 | Blackner |
| 6,137,083 A | 10/2000 | Bost et al. |
| 6,145,787 A | 11/2000 | Rolls |
| 6,194,685 B1 | 2/2001 | Rutherford |
| 6,194,692 B1 | 2/2001 | Oberle |
| 6,202,304 B1 | 3/2001 | Shatz |
| 6,237,874 B1 | 5/2001 | Rutherford et al. |
| 6,279,856 B1 | 8/2001 | Rutherford et al. |
| 6,330,986 B1 | 12/2001 | Rutherford et al. |
| 6,338,455 B1 | 1/2002 | Rauch et al. |
| 6,371,242 B1 | 4/2002 | Wilson et al. |
| 6,371,411 B1 | 4/2002 | Breer et al. |
| 6,403,935 B2 | 6/2002 | Kochman et al. |
| 6,457,676 B1 | 10/2002 | Breer et al. |
| 6,483,087 B2 | 11/2002 | Gardner et al. |
| 6,521,873 B1 | 2/2003 | Cheng et al. |
| 6,730,892 B2 | 5/2004 | Suda et al. |
| 6,832,742 B2 | 12/2004 | Petrenko et al. |
| 6,848,656 B2 | 2/2005 | Linton |
| 6,870,139 B2 | 3/2005 | Petrenko |
| 6,891,136 B2 | 5/2005 | Bikovsky et al. |
| 6,917,021 B2 | 7/2005 | Kano |
| 7,012,501 B2 | 3/2006 | Krumphals et al. |
| 7,034,257 B2 | 4/2006 | Petrenko |
| 7,078,658 B2 | 7/2006 | Brunner et al. |
| 7,211,772 B2 | 5/2007 | Carpino et al. |
| 7,313,947 B2 | 1/2008 | Harris et al. |
| 7,329,843 B2 | 2/2008 | Bikovsky et al. |
| 2001/0003897 A1 | 6/2001 | Porte et al. |
| 2002/0096506 A1 | 7/2002 | Moreland et al. |
| 2002/0148929 A1 | 10/2002 | Andre et al. |
| 2002/0153367 A1 | 10/2002 | Haas et al. |
| 2002/0153368 A1 | 10/2002 | Gardner et al. |
| 2003/0001719 A1 | 1/2003 | Schemenaur et al. |
| 2003/0209534 A1 | 11/2003 | Ferguson |
| 2003/0222077 A1 | 12/2003 | Suda et al. |
| 2003/0234248 A1 | 12/2003 | Kano et al. |
| 2004/0000615 A1 | 1/2004 | Gonidec et al. |
| 2004/0065659 A1 | 4/2004 | Tse |
| 2004/0069772 A1 | 4/2004 | Kondo et al. |
| 2004/0074899 A1 | 4/2004 | Mariner et al. |
| 2004/0237502 A1 | 12/2004 | Moe et al. |
| 2005/0006529 A1 | 1/2005 | Moe et al. |
| 2005/0109011 A1 | 5/2005 | Courtot et al. |
| 2005/0178924 A1 | 8/2005 | Bertolotti |
| 2005/0189345 A1 | 9/2005 | Brunner et al. |
| 2005/0194371 A1 | 9/2005 | Weinfield et al. |
| 2006/0032983 A1 | 2/2006 | Brand et al. |
| 2006/0201933 A1 | 9/2006 | Carpino et al. |
| 2007/0164015 A1 | 7/2007 | Carpino et al. |
| 2007/0210073 A1 | 9/2007 | Hubert et al. |

FOREIGN PATENT DOCUMENTS

| | | | |
|---|---|---|---|
| GB | 885131 A | 12/1961 |
| GB | 2 243 412 A | 10/1991 |
| WO | WO 91/11891 A1 | 8/1991 |
| WO | WO 99/28535 A1 | 6/1999 |
| WO | WO 2005/020635 A1 | 3/2005 |

OTHER PUBLICATIONS

Extended European Search Report and Opinion (EP Appln. No. 06026086.6) 5 pages, maied Apr. 5, 2007.

R.E. Evans, D.E. Hall and B.A. Luxon, Nickel Coated Graphite Fiber Conductive Composites, SAMPE Quarterly, vol. 17, No. 4, Jul. 1986.

ACOUSTIC NACELLE INLET LIP HAVING COMPOSITE CONSTRUCTION AND AN INTEGRAL ELECTRIC ICE PROTECTION HEATER DISPOSED THEREIN

RELATED APPLICATIONS

This application is a continuation-in-part of U.S. patent application Ser. No. 11/276,344, filed Feb. 24, 2006, now U.S. Pat. No. 7,291,815 and claims priority to U.S. provisional Application Ser. No. 60/791,967, filed Apr. 14, 2006. The entire contents of the aforementioned applications are hereby incorporated by reference.

FIELD OF THE INVENTION

The invention relates to ice protection systems for aircraft. More specifically, the invention relates to an aircraft equipped with a composite nacelle inlet lip having both an embedded electrical ice protection system and acoustic treatment.

BACKGROUND OF THE INVENTION

Aircraft engine nacelles are prone to ice buildup. FIG. 1 shows a schematic representation of a typical high-speed jet engine assembly 1400. Air enters through inlet section 1414, between fan blade spinner 1416 and the annular housing 1418, which constitutes the forward most section of the engine nacelle 1420, and includes nacelle inlet lip 1421. Hot, high-pressure propulsion gases pass through the compressor section 1417 and the exhaust assembly (not shown) out the rear of the engine. An annular space or D-duct 1430 is defined by bulkhead 1428 and annular housing 1418. Bulkhead 1428 separates D-duct 1430 from the interior portion 1431 of the inner barrel 1412. In flight, under certain temperature and humidity conditions, ice may form on the nacelle inlet lip 1421, which is the leading edge of annular housing 1418, and on the fan blade spinner 1416. Accumulated ice can change the geometry of the inlet area between annular housing 1418 and fan blade spinner 1416, and can adversely affect the quantity and flow path of intake air. In addition, pieces of ice may periodically break free from the nacelle 1420 and enter the engine 1450, potentially damaging fan/rotor blades 1460 and other internal engine components.

Engine nacelles also channel fan noise from the engines, which can be a prime source of aircraft noise. As is known to those skilled in the art, aircraft engine fan noise can be suppressed at the engine nacelle inlet 1414 with a noise absorbing inner barrel liner 1440, which converts acoustic energy into heat. The liner 1440 normally consists of a porous face skin supported by an open cell backing to provide required separation between the porous face sheet and a solid back skin. This arrangement provides effective and widely accepted noise suppression characteristics. Aircraft engines with reduced noise signatures are mandated by government authorities, and as a result, are demanded by aircraft manufacturers, airlines and local communities.

The prior art includes designs for combating both noise and ice buildup on nacelle surfaces, and on nacelle inlets, in particular.

Others have developed an acoustically treated nacelle inlet having a hot air ice protection system. An acoustic liner positioned forward of the inlet throat has a perforated face skin, a perforated back skin, and an acoustic core between the face skin and the back skin. The openings through the face skin are sized to allow acoustic energy to be transmitted to and dissipated in the acoustic core, and the openings in the back skin are sized to channel hot gas from the engine through the acoustic liner to the surface of the inlet to heat the inlet and prevent and/or restrict ice formation on the inlet.

U.S. Published Patent Application No. 2005/006529, assigned to Rohr Inc., discloses an acoustically treated nacelle inlet having a low power electric heat ice protection system. As used herein, the term "low power" is intended to mean average electric power consumption less than about 1 watt per square inch (W/sq. in.). The electric power supply may be a conventional source such as batteries, or it may be the engine or an auxiliary power unit (APU), or a combination thereof.

FIG. 2 shows a schematic cross-sectional view of an inlet lip 1521 like that described in the above-identified published application. The bulkhead 1528 and the inlet lip 1521 define a D-duct 1530. The inlet lip 1521 includes a noise abatement structure, which in this embodiment is an acoustic panel 1504 comprising an open cell core 1508, a solid back skin 1509, and an acoustically permeable front skin 1510. The acoustic panel 1504 may be extended around the leading edge of the nacelle 1520 (as shown in dashed lines 1514 in FIG. 2), rather than ending at or near the leading edge 1505 of the nacelle 1520, as shown. A low power electric ice protection system (referred to herein by the acronym IPS) 1512 overlays the outer surface of the front skin 1510, in the manner described below.

FIG. 3 shows an exploded view of the acoustic panel 1504 shown in FIG. 2. The acoustic panel 1504 comprises a single degree-of-freedom open cell core 1508, a solid back skin 1509, and a perforated front skin 1510. Panels of this sort are well known to those skilled in the art. The perforations or openings in the front skin 1510 permit interaction between the open cell core 1508 and sound waves generated during operation of the gas turbine engine surrounded by the nacelle 1520. The open cell core 1508 is affixed via epoxy or other adhesive bonding to each of the skins 1510 and 1509. The sandwich structure defined by the core 1508, back skin 1509, and front skin 1510 can be made of either a metallic material, such as aluminum, a non-metallic material, such as a graphite/epoxy laminate, or a combination thereof.

The low power IPS 1512 is affixed using conventional bonding techniques (e.g., adhesive bonding) to the outer surface of the front skin 1510. The IPS 1512 is connected to an electric power supply or source (not shown in FIG. 2 or 3) by wiring. The IPS 1512 comprises an electrically conductive material that is permeable to sound waves, and can be a fine grid stainless steel wire mesh adhesively bonded to the outer surface of the perforated skin 1510. The fine grid wire mesh typically has a Rayl value between about 50-150, and preferably between about 70-110. The IPS is affixed to the skin 1510 of the acoustic panel 1504 in such a manner that it does not substantially block or otherwise interfere with a substantial number of openings in the skin 1510 of the acoustic panel 1504. This goal may be achieved by, e.g., selecting the size, shape and configuration of the wire mesh comprising the IPS 1512 vis-à-vis the size, shape and configuration of the perforation pattern in the skin 1510; and/or by using well-established bonding methodologies sufficient to minimize blocking the openings with wire mesh and the adhesive used to affix the mesh to the skin 1510. In prior art systems, typically no more than about 1-2% of the openings are completely blocked, although this figure may range as high as 5% or even 10%.

The prior art system of FIG. 2 also includes a parting strip heater 1507. The parting strip heater 1507 is adhesively bonded to the front skin 1510 at or near the highlight 1505 of the nacelle (and away from the IPS 1512), where the highlight 1505 is the peak of the curved nose of the nacelle. Parting strip heater 1507 comprises an electrifiable grid material preferably made of heavier gage wire elements as compared to the IPS 1512 wire mesh, in order to conduct a higher power electrical current.

FIG. 4 depicts a perspective view of a portion of a prior art aircraft nacelle 1520 comprising inlet lip 1521. Bulkhead 1528 and inlet lip 1521 define the nacelle interior chamber or D-duct 1530. Bulkhead 1528 also separates the D-duct 1530 from the interior portion 1531 of inner barrel 1512. An acoustic panel 1504 forms the interior portion of the inlet lip 1521. An IPS 1512 and its associated thermal insulation layer (not shown) are affixed upon the surface of the acoustic panel, and extend around inlet lip 1521, approximately to the highlight 1505. In the prior art system of FIG. 4, the inner barrel 1512, which is joined to the inlet lip 1521 by joint 1514, comprises one or more acoustic open cell panels 1506 for noise abatement. A second joint 1515 joins the nacelle inlet lip 1521 to the nacelle outer barrel 1516. The prior art system shown in FIG. 4 further comprises a parting strip 1507 at or near the highlight 1505 of the nacelle, depending upon the location of the stagnation point of the nacelle (i.e. the point on the nacelle inlet lip at which the free stream air impacts directly upon the nacelle inlet lip, and where the impacting air is stagnant). The IPS 1512 and parting strip 1507 are electrically connected (by means not shown) to power supplies of the type previously described.

Though such prior art nacelle inlet lips may be effective in attenuating engine noise and electro-thermally eliminating or minimizing ice buildup on engine nacelles, such prior art devices have at least some shortcomings. First, a heating element that is externally mounted on a nacelle inlet lip may be susceptible to damage from impacts by objects striking the inlet lip. In addition, externally applied heating elements may delaminate from the inlet lip outer skin during prolonged service. In addition, the adhesives used to bond porous, externally applied heating elements can at least partially block the acoustic openings in the heaters, thereby reducing the percentage of open area ("POA") of the heaters, and decreasing the sound-attenuation capabilities of the inlet lip. Accordingly, there is a need for an acoustically treated nacelle inlet lip having integrally formed, embedded electro-thermal heating elements, and a sufficiently large POA to provide a substantial degree of engine noise-attenuation.

SUMMARY OF THE INVENTION

The invention includes an acoustically treated aircraft engine nacelle inlet lip. The inlet lip can include an acoustic cellular core arranged along an inner barrel portion of the inlet lip, the acoustic core comprising a laminated composite outer skin and an inner skin. The inlet lip also can include an erosion shield arranged over at least a portion of the laminated composite outer skin, and overlying at least a portion of the acoustic core. The laminated composite outer skin can include at least one electrically conductive heater layer disposed therein, and can include a first set of openings extending therethrough, the first set of openings communicating with the acoustic cellular core. The erosion shield can include a second set of openings extending therethrough, the second set of openings communicating with the first set of openings.

The invention also includes a noise-attenuating, selectively heatable nacelle inlet lip for an aircraft engine. The inlet lip can include a contoured outer skin structure including a plurality of composite layers. The inlet also can include at least one electrically conductive layer disposed between at least two of the composite layers. The inlet lip can further include a plurality of openings extending through the plurality of composite layers and the electrically conductive sheet.

The invention further includes a nacelle inlet lip having an acoustic cellular core, and a plurality of composite outer skin layers covering an outer face of the acoustic cellular core. At least one electrically conductive heater element can be disposed between at least two of the composite outer skin layers. At least some of the outer skin layers and the heater element can include a plurality of openings extending therethrough, the openings forming acoustic pathways to the acoustic cellular core.

The invention also includes a nacelle inlet lip having an acoustic cellular core, and an outer skin layer including a plurality of composite outer skin layers, and covering an outer face of the acoustic cellular core. The inlet lip also can include means for heating at least a portion of the outer skin layer, the heating means being disposed between at least two of the composite outer skin layers. The inlet lip can further include means for permitting sound waves to pass through at least a portion of the outer skin and the heating means to the acoustic cellular core.

In addition, the invention includes a method of forming a composite nacelle inlet lip. The method can include providing a tool having a contoured channel, and placing a porous erosion shield in the channel. The method also can include placing a composite outer skin on the erosion shield, the composite outer skin including a plurality of composite outer skin layers and at least one heater element disposed between at least two of the composite outer skin layers, and including a plurality of openings extending through the composite outer skin layers and the heater element. The method can further include placing an acoustic cellular core on the composite outer skin, placing at least one composite inner skin on the acoustic cellular core, and heat curing the erosion shield, composite outer skin, acoustic cellular core, and composite outer skin to form a unitary composite structure.

These and other aspects of the invention will be understood from a reading of the following detailed description together with the drawings.

DETAILED DESCRIPTION

Figure 1:
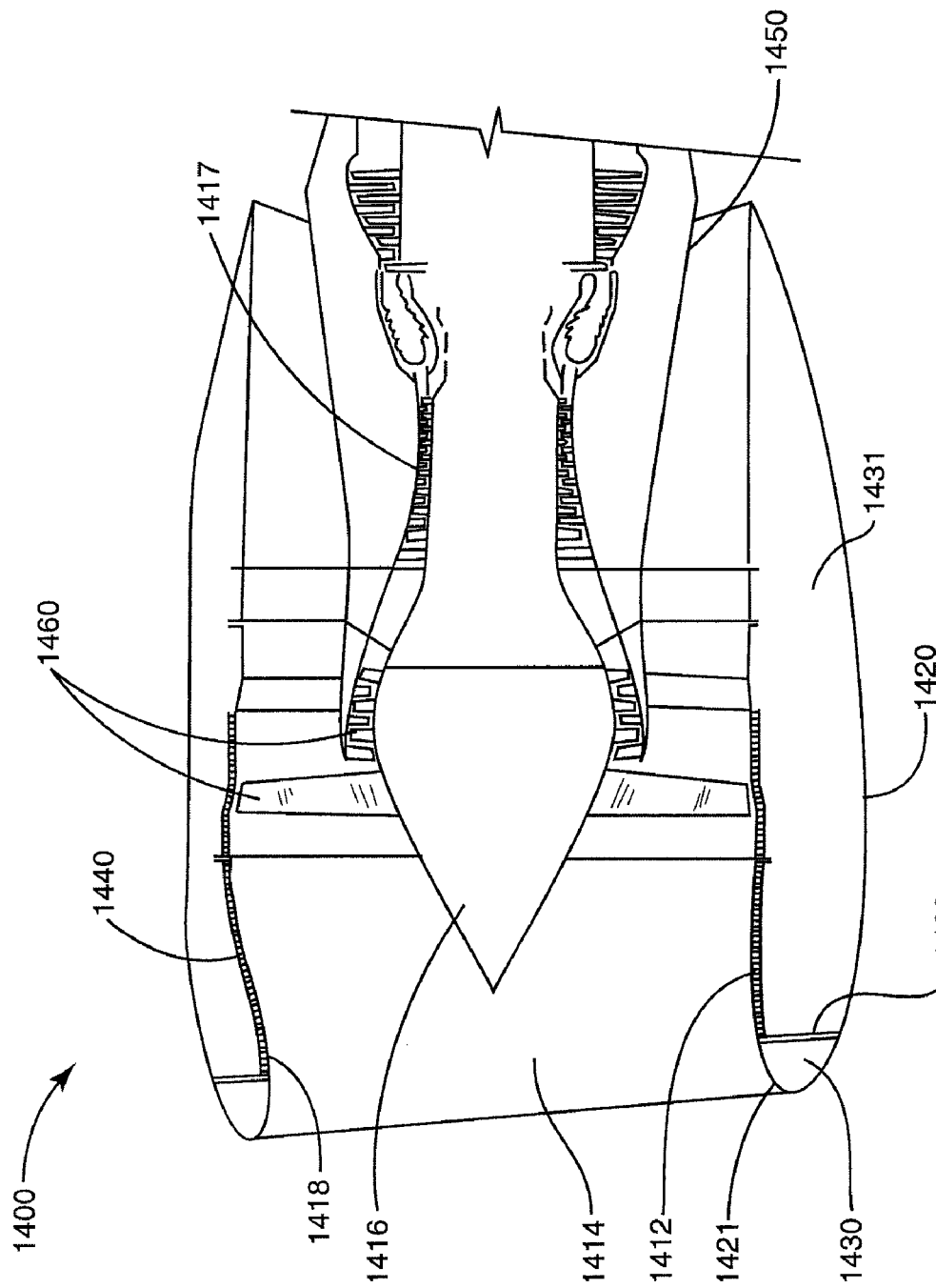
FIG. 1 is a side cross-sectional view of a typical engine nacelle attached to the forward portion of an engine assembly.
Figure 2:
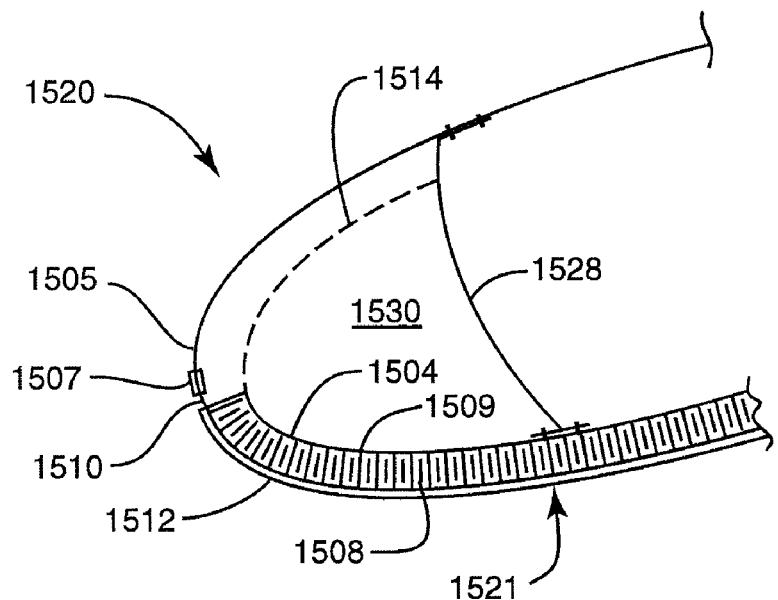
FIG. 2 is a cross-sectional view of a prior art nacelle inlet having acoustic treatment and an electrical heating system.
Figure 3:
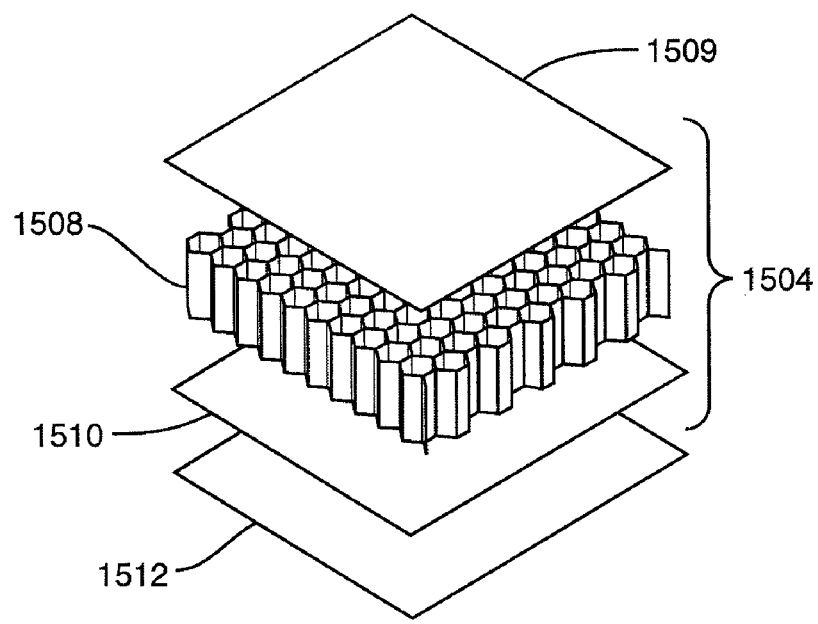
FIG. 3 is an exploded view of the acoustic treatment of FIG. 2.
Figure 4:
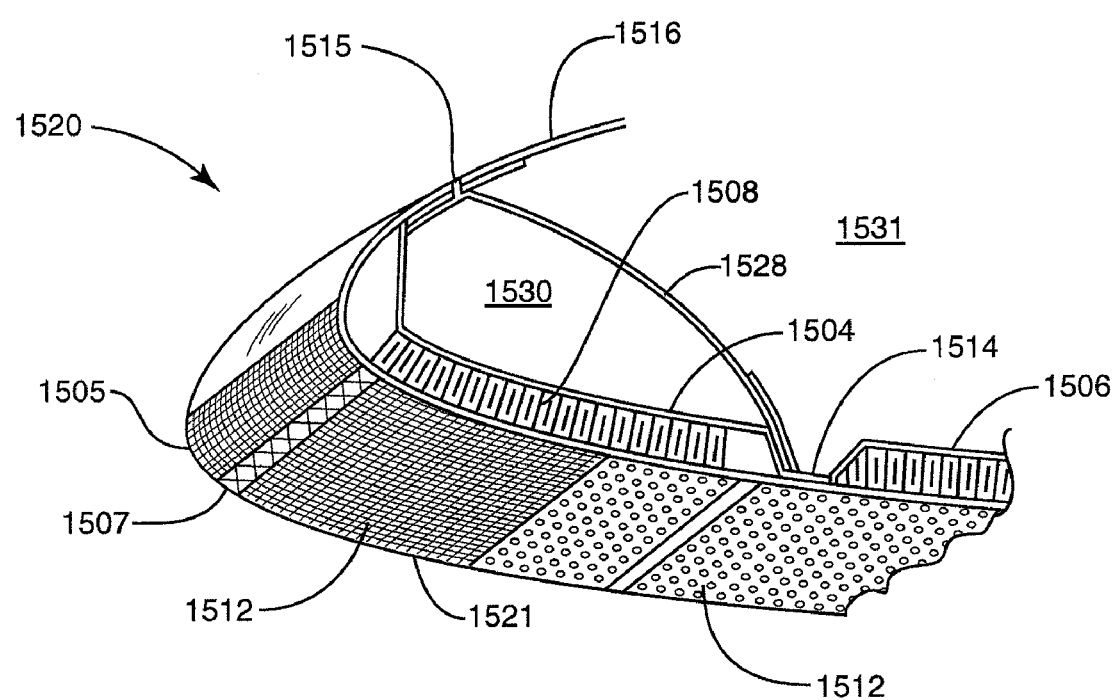
FIG. 4 is a detailed perspective view of a prior art nacelle inlet having acoustic treatment and an electrical heating system.
Figure 5:
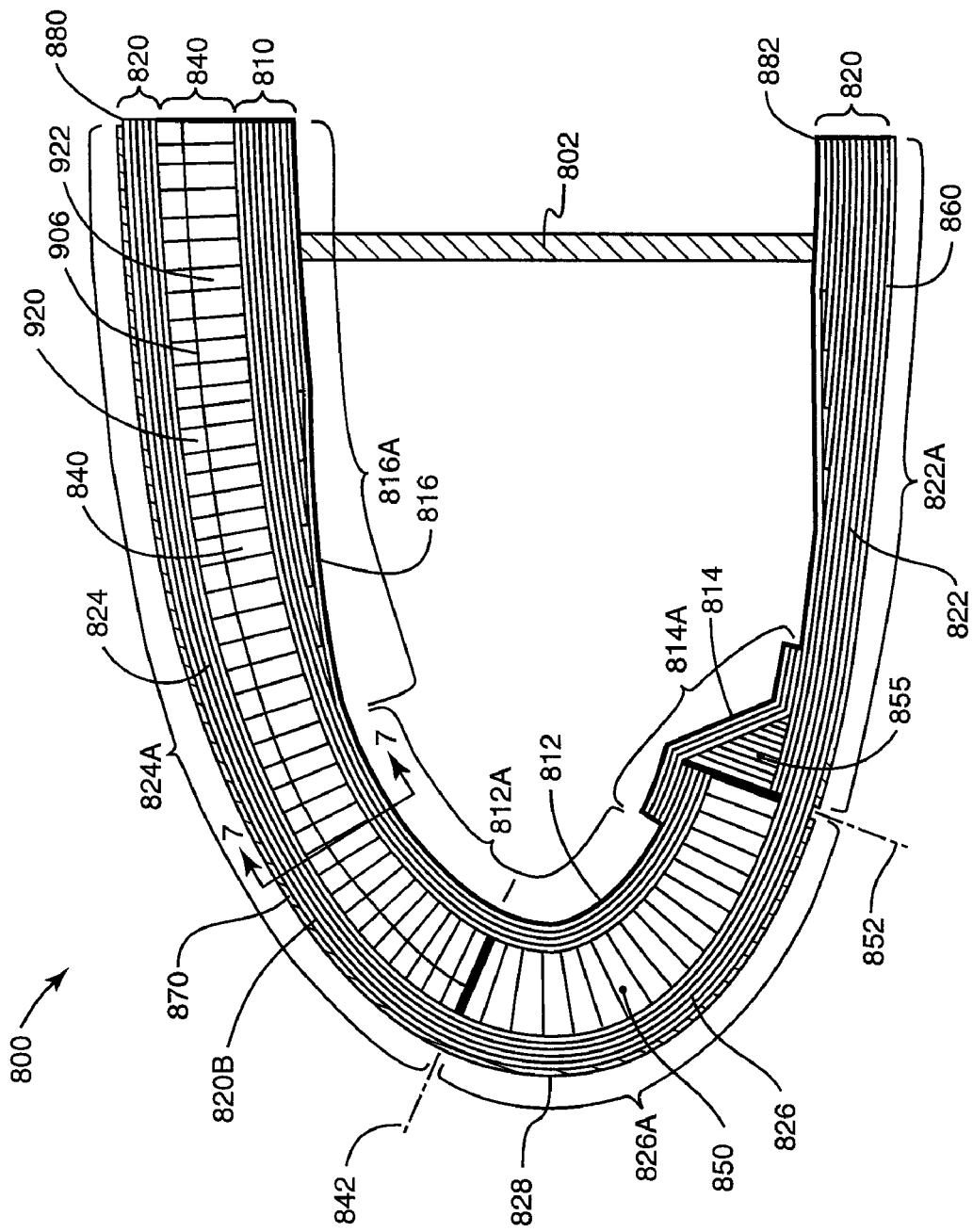
FIG. 5 is a cross-sectional view of a portion of a nacelle inlet lip in accordance with the present invention.

FIG. 5 shows a cross-section of a portion of one embodiment of a nacelle inlet lip 800 in accordance with the present invention. The inlet lip 800 includes an inner skin generally designated by reference numeral 810, and an outer skin generally designated by reference numeral 820. Both the inner skin 810 and outer skin 820 are connected to a bulkhead 802. The inner skin 810 and the outer inner skin 820 each comprises a multi-layer structure formed at least in part of a cured composite material, such as layers of graphite-epoxy fabric.

The inner skin 810 includes a plurality of sections, including a leading edge inner skin section 812 (extending along the region designated by reference numeral 812A in FIG. 5), a closeout section 814 (extending along the region designated by reference numeral 814A in FIG. 5), and a doubler section 816 (extending along the region designated by reference numeral 816A in FIG. 5).

The leading edge inner skin section 812 comprises a plurality of graphite-epoxy plies, and includes four plies in one embodiment. During manufacture of the leading edge inner skin section 812, the weave pattern of each layer of graphite-epoxy cloth material preferably is arranged on a bias relative to adjacent layers. For example the weave patterns of the four layers may be laid at 0°, 45°, −45° and 0° relative to a horizontal frame of reference of a mold in which the layers are stacked.

The multi-ply (e.g., 3-ply in one embodiment) closeout section 814 connects the leading edge inner skin section 812 to an outer barrel portion 822 of outer skin 820. The closeout section 814 comprises a closeout core material 855 formed from fiberglass for structural support.

In one embodiment, the multi-ply doubler section 816 comprises, in part, a stepped or tapered 4-ply reinforced portion having a thickness that is sufficient to provide an anchor for attachment to an inner edge of bulkhead 802. For example, in one embodiment, the 4-ply construction has a thickness of about 0.25-0.35 cm.

The outer skin 820 comprises a plurality of graphite-epoxy plies, and preferably is formed as a continuous unit. However, this continuous unit can be considered to have a number of different portions, each of whose significance is described further below. These portions can include an outer barrel portion 822 (the extent of which is indicated by reference numeral 822A in FIG. 5), an inner barrel portion 824 (the extent of which is indicated by reference numeral 824A in FIG. 5), and a leading edge portion 826 (the extent of which is indicated by reference numeral 826A in FIG. 5) which connects the outer and inner barrel portions 822, 824. As discussed further below, the outer barrel portion 824 of the outer skin 820 is acoustically permeable, and preferably includes a plurality of spaced openings extending through the skin 820 for acoustic treatment purposes. The leading edge outer skin portion 826 includes highlight 828, which is the forward most point in the cross-section of the inlet lip 800.

As shown in FIG. 5, an acoustic cellular core 840 is positioned along the extent 824A of the inner barrel inner skin portion 824 (i.e., between an inside edge 880 and boundary 842). In combination with the inner skin 810 and outer skin 820, the acoustic cellular core 840 functions to attenuate noise within the inlet portion of the nacelle to which the inlet lip 800 belongs. The acoustic cellular core 840 also provides strength and rigidity to the inlet lip 800.

In one embodiment, the acoustic cellular core 840 has a double-degree-of-freedom honeycomb construction of a type known to those skilled in the art. The acoustic cellular core 840 extends between the inner barrel portion 824 of the outer skin 820 on one side, and a portion of inner skin section 812 and all of doubler section 816 of the inner skin 810 on the other side. In one embodiment, as shown in FIG. 5, no portion of the acoustic cellular core 840 extends past the highlight 828. In other words, in the embodiment shown in FIG. 5, all portions of the acoustic cellular core 840 are coextensive with an inboard surface of the inlet lip 800.

Figure 6:
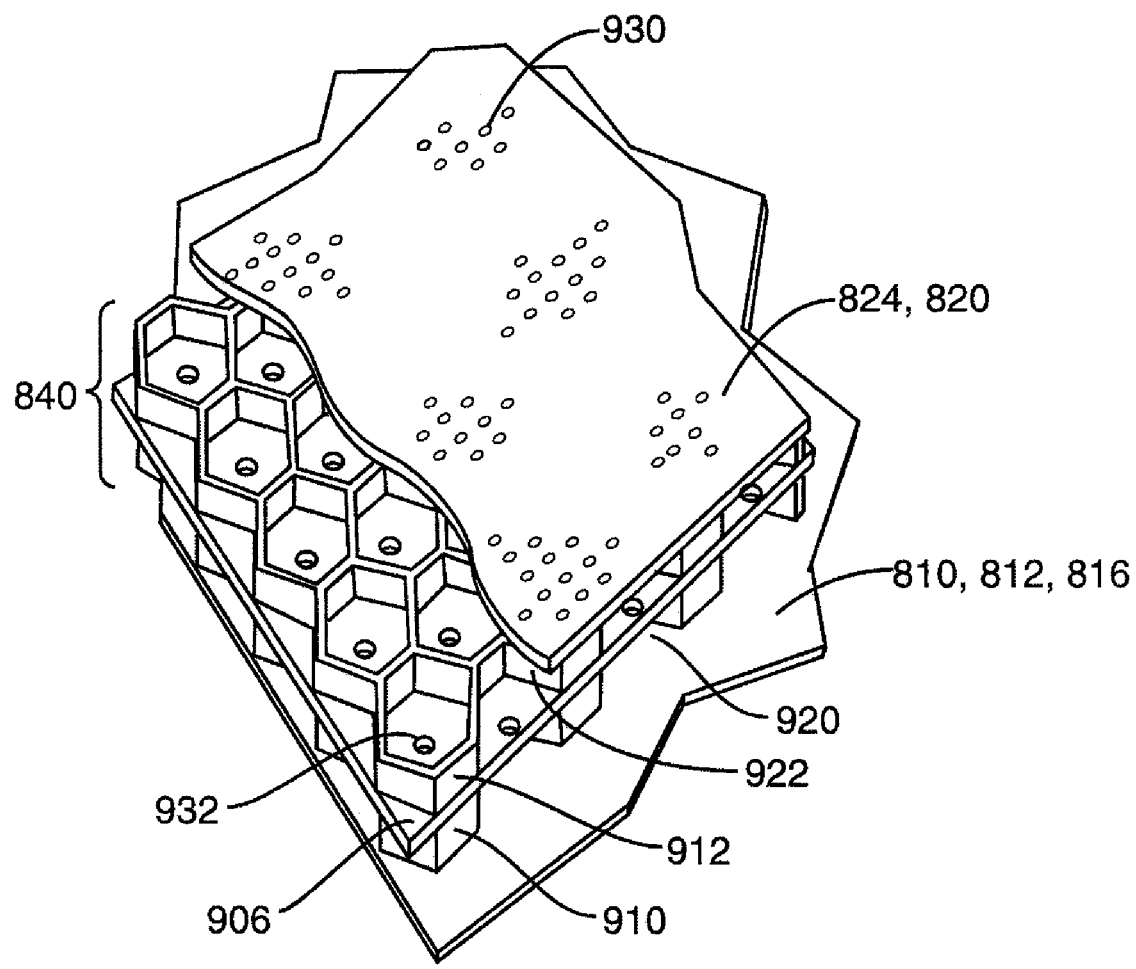
FIG. 6 is a detail perspective view of a portion of an outer skin structure including an acoustic cellular core of a type that may be employed in the inlet lip of FIG. 5.

FIG. 6 shows a detailed view of one construction of a portion of the inlet lip that includes the acoustic cellular core 840. The acoustic core 840 is disposed between the perforated inner barrel outer skin portion 824 and the imperforate inner skin 810, 812, 816. In the embodiment shown, the acoustic cellular core 840 includes a first sheet 910 of open cells 920, a second sheet 912 of open cells 922, and a septum 906 disposed between the first and second sheets 910, 912. The open cells 920, 922 may have a hexagonal or honeycomb shape as shown in FIG. 6, or may have any other desired shape. The open cells 920 of the first sheet 910 and the open cells 922 of the second sheet 912 may be substantially aligned with one another as shown in FIG. 6. Alternatively, the first and second sheets 910, 912 and open cells 920, 922 may be laterally offset from one another (in a manner known to persons skilled in the art). In one embodiment, the cells 920 of the first sheet 910 are shallower than the cells 922 of the second sheet 912. For instance, the cells 920 of the first sheet 910 may be about 0.5 cm deep, and the cells 922 of the second sheet 912 may be about 2.0 cm deep. Alternatively, the cells 920, 922 may have equal depths, or other different depths. In some embodiments, the first and second open cell sheets 910, 912 are separately formed, and each sheet 910, 912 is bonded to one of the opposed sides of the septum 906, thus forming the acoustic cellular core 840. In other embodiments, the first and second sheets 910, 912 are portions of a single open cell sheet, and the septum 906 is introduced within the open cells of the single open cell sheet to divide the cells into two separate cell portions 920, 922 in a manner known in the art.

Regardless of how the acoustic cellular core 840 is formed, the septum 906 includes a first set of openings 932. Alternatively, the septum 906 may be constructed of a porous or permeable material that permits sound waves to pass through the septum. In such an embodiment, the first set of openings 932 is a plurality of pores or other open pathways that extend through the thickness of the septum 906. In addition, the overlaid inner barrel outer skin portion 824 includes a second set of openings 930. The inner skin 810, 812, 816 backing the acoustic cellular core 840 is devoid of such openings, consistent with the double-degree-of-freedom construction. The first and second sets of openings 932, 930 may have the same or different patterns, sizes and/or spacings. In one embodiment, each set of openings 932, 930 is arranged in a uniform pattern, such that the openings 932 or 930 are evenly spaced apart in a rectangular, hexagonal, staggered-row, or other uniform distribution.

Returning to FIG. 5, a flexible structural cellular core 850 is positioned along the extent 826A of the leading edge portion 826 of the outer skin 820. In one embodiment, the structural cellular core 850 has a honeycomb structure formed from a non-metallic material, such as heat resistant phenolic-reinforced (HRP) fiberglass, of a type known to those skilled in the art. Such a flexible, non-metallic open cell matrix more easily conforms to the acute curvature of the leading edge of the nose lip 800 than metallic open cell core materials. In the embodiment shown, the boundary 842 between the inner barrel outer skin portion 824 and the leading edge outer skin portion 826 coincides with the boundary between the acoustic cellular core 840 and the structural cellular core 850. Along the leading edge, outer skin portion 826 forms a face sheet of the structural cellular core 850, and the inner skin 812 and closeout section 814 form a backing sheet for the structural cellular core 850. Like the acoustic cellular core 840, the structural cellular core 850 provides the inlet lip 800 with structural rigidity. However, unlike the acoustic core 840, the structural cellular core 850 does not play a role in noise attenuation.

The boundary 852 between the leading edge outer skin portion 826 and the outer barrel outer skin portion 822 is defined by the rearward extent of the structural cellular core 850 and aft edge 882. In the outer barrel portion 822, the outer skin 820 comprises, in part, a multi-ply composite construction having a thickness sufficient to provide adequate structural integrity to the outer portion of the inlet lip 800, and to anchor an outer edge of the bulkhead 802. In one embodiment, the outer barrel portion 822 of the multi-ply outer skin 820 has a thickness of about 0.3-0.4 cm.

At least part of the outer barrel portion 822 of the outer skin 820 may be covered by a lightning shield 860. In some embodiments, the entire outer barrel outer skin portion 822 is covered by the lightning shield 860. In one embodiment, the lightning shield 860 comprises a thin conductive mesh formed of copper, and having a thickness between about 0.015 and about 0.020 cm. Alternatively, the lightning shield 860 may include a conductive surfacing film comprising a non-woven metallic copper mesh impregnated with toughened epoxy resin of a type well known to those skilled in the art.

Portions of the surface of the outer skin's inner barrel portion 824 and leading edge portion 826 are covered by an erosion shield 870. In some embodiments, the entire extent of the inner barrel portion 824 and leading edge portion 826 of the outer skin 820 is covered by the erosion shield 870. The erosion shield 870 in these regions protects the outer skin 820 against erosion by particulates that may otherwise damage the composite materials of the outer skin 820. In one embodiment, the lightning shield 860 and the erosion shield 870 are spaced apart from one another on the outer skin 820 such that they are in non-overlapping arrangement with one another. Alternatively, the lightning shield 860 and the erosion shield 870 may at least partially overlap, and have an electrically insulating material disposed therebetween (not shown). In one embodiment, the erosion shield 870 includes eight separate circumferential sections, each section spanning a 45-degree segment of the inlet lip 800. The erosion shield segments are bonded to the outer skin 820 using methods well known in the art. In one embodiment, the erosion shield 870 comprises a titanium alloy sheet (e.g., Ti-6Al-4V, a titanium alloy which is well-known to persons skilled in the art) that is about 0.015-0.25 cm thick. In another embodiment, the erosion shield 870 comprises an aluminum sheet of a similar thickness. In yet another embodiment, the erosion shield 870 comprises a stainless steel screen.

Returning briefly to FIG. 6, inner barrel outer skin portion 824 includes a second set of spaced openings 930. As described below, after the composite outer skin 820 is laid up and cured, the openings 930 can be formed in a conventional manner using erosive blasting and a perforated mask having a pattern of holes corresponding to those locations where openings 930 are to be eroded in the composite outer skin 820. Other portions of the outer skin 820 may be covered with a non-perforated mask, or otherwise protected from erosive blasting.

The erosion shield 870 includes a third set of openings (not shown in the figures) in that portion that coincides with the acoustic cellular core 840; i.e., in that portion that coincides with the inner barrel portion 824 of the outer skin 820. This third set of openings in the erosion shield 870 communicates with the second set of openings 930 in the composite outer skin 824 in this region. As a result, acoustic pathways extend through the erosion shield 870, through the outer skin 824, into the outer cells 920 of the acoustic core 840, through the first set of openings 932 in the septum 906 of the acoustic core 840, and into the inner cells 920, thereby effecting noise attenuation via Helmholtz resonance.

The third set of openings in the erosion shield 870 may be micro-perforations, which typically are formed by laser drilling. In one embodiment, the micro-perforations in the titanium alloy erosion shield 870 have a hole density of about 2,800-3,300 holes/cm$^2$, and have a diameter equal to about 0.005 cm. Lower perforation densities (and thus lower POAs) may be acceptable when the erosion shield 870 comprises an aluminum sheet, and still lower perforation densities may be acceptable when the erosion shield 870 comprises a stainless steel screen.

Figure 7:
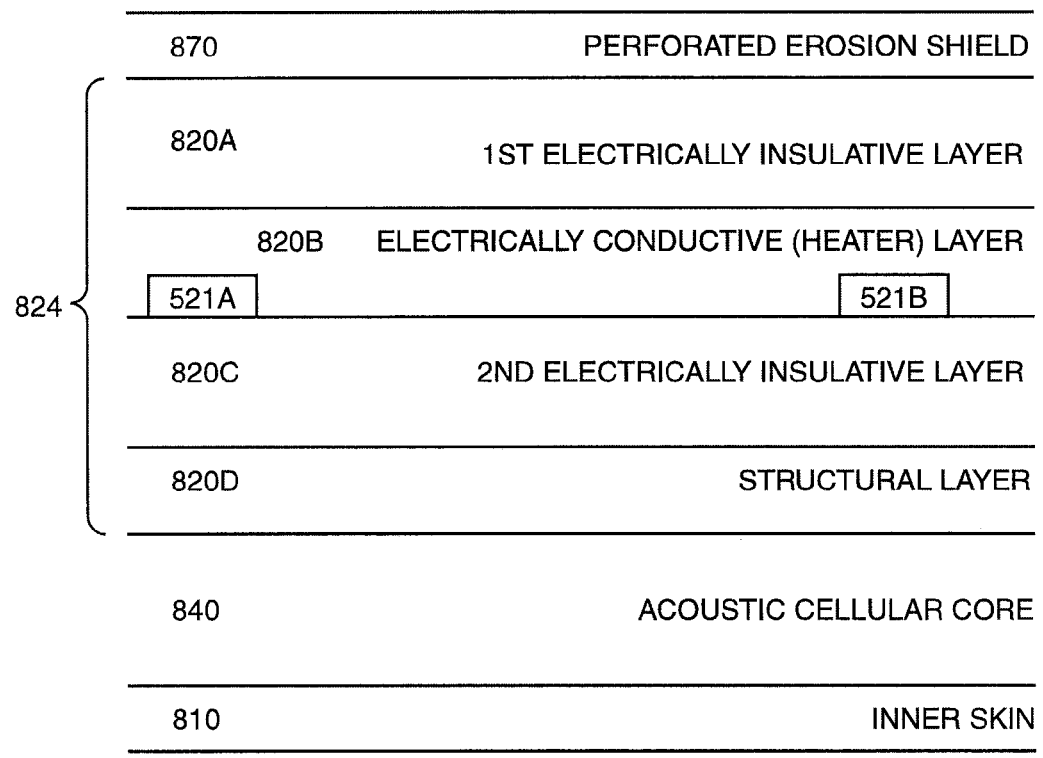
FIG. 7 shows the layers of an outer skin bounded on opposite sides by an erosion shield and an acoustic core.

FIG. 7 shows a cross-sectional view of the inlet lip 800 taken through inner barrel portion 824A of the nose lip (as indicated by section line 7-7 in FIG. 5). It is understood that the thicknesses of the various layers shown in FIG. 7 are not necessarily to scale. The outer skin 824 includes, a first (outer) electrically insulating layer 820A, an electrically conductive layer 820B and associated and associated electrical bus strips 821A, 821B, a second (inner) electrically insulating layer 820C, and a structural support layer 820D. Accordingly, the outer skin 824 is a laminated composite structure having an integrated, electrically conductive layer 820B embedded therein. The construction of such a laminated structure and a method of producing such a perforated composite outer skin 824 with an embedded conductive layer 820B are described in detail below. In an alternative embodiment having an erosion shield 870 with sufficient thickness to structurally support the outer skin 824, the structural layer 820D shown in FIG. 7 can be omitted from the outer skin 824.

Within the outer skin 824, the electrically conductive layer 820B forms an electric ice protection heater. The electrically conductive layer 820B may include a single electrothermal heating element, or a plurality of spaced, independently operable heating elements. If desired, the electrically conductive layer 820B may include a parting strip heater element located proximate to the leading edge of the inlet lip 800 (not shown in the figures).

Figure 8:
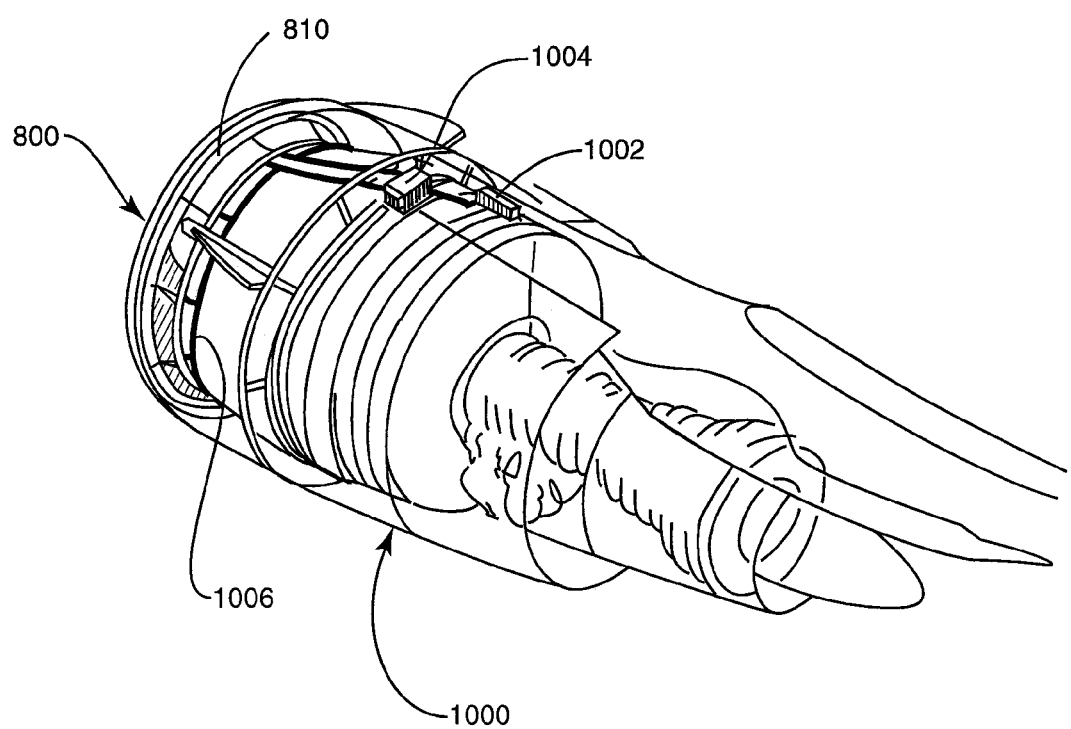
FIG. 8 illustrates the inlet lip of the present invention mounted on a nacelle.

FIG. 8 shows an inlet lip 800 installed on a nacelle body 1000. A junction electrical pylori box 1002, working in tandem with a control unit 1004, provides the necessary connections and switches to distribute power to the conductive layer 820B (not seen in FIG. 8) via wiring 1006. In one embodiment, the wiring 1006 passes through openings formed in the inner skin 810 to reach the electrically conductive heater layer 820B. In other embodiments, wiring 1006 is attached to the electrically conductive heater layer 820B either at a rearward edge 880 of the inner barrel portion 824, or proximate to a rearward edge 882 of the outer barrel portion 824.

While the foregoing discussion has been directed to the inlet lip 800 shown in FIG. 5, it should be understood that other variations of the described inlet lip 800 are within the scope of the present invention, at least one common theme being that the outer skin is a laminated composite structure having an embedded conductive layer which is operable as an electric ice protection heater.

Figure 9A:
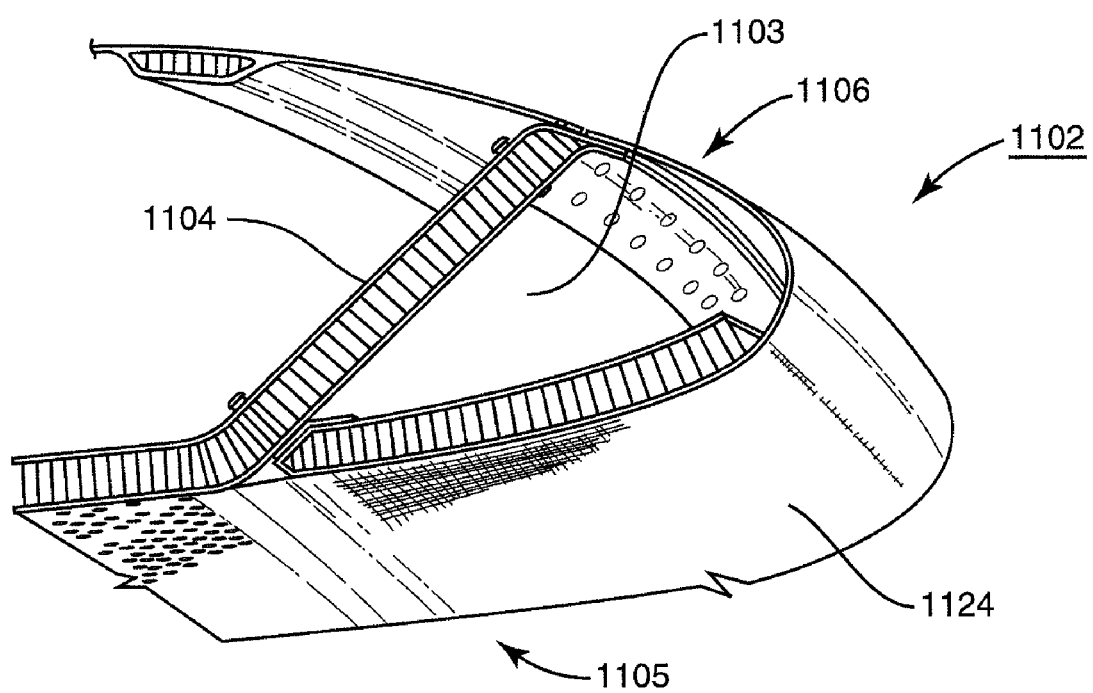
FIGS. 9A-9E show other embodiments of an inlet lip in accordance with the present invention.

In the variation shown in FIG. 9A, an inlet lip 1102 includes an integral bulkhead 1104 connecting an inner barrel side 1105 of the inlet lip 1102 to an outer barrel side 1106 of the inlet lip 1102, thereby formed a D-duct 1103. In the shown embodiment, the integral bulkhead 1104 has an open cell or honeycomb structure. Other constructions of the bulkhead 1104 also are possible. Like the inlet lip 800 described above, the inlet lip 1102 includes at least one electrically conductive heater layer embedded within its composite outer skin 1124 (not shown in FIG. 9A).

Figure 9B:
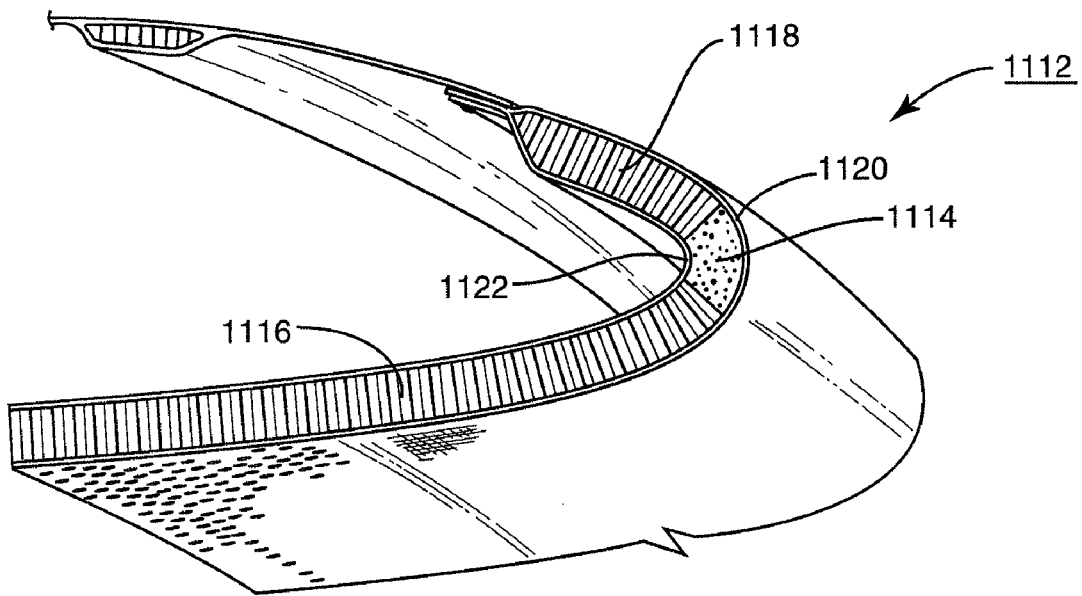

In another variation shown in FIG. 9B, a forward-most portion of an inlet lip 1112 includes a section of structural foam 1114 positioned between an acoustic core 1116 and a structural core 1118 in one direction, and between a structural outer skin 1120 and an inner skin 1122 in the other direction. Again, like the inlet lips 800, 1102 described above, the inlet lip 1112 includes at least one electrically conductive heater layer embedded within its composite outer skin 1120 (not shown in FIG. 9B).

Figure 9C:
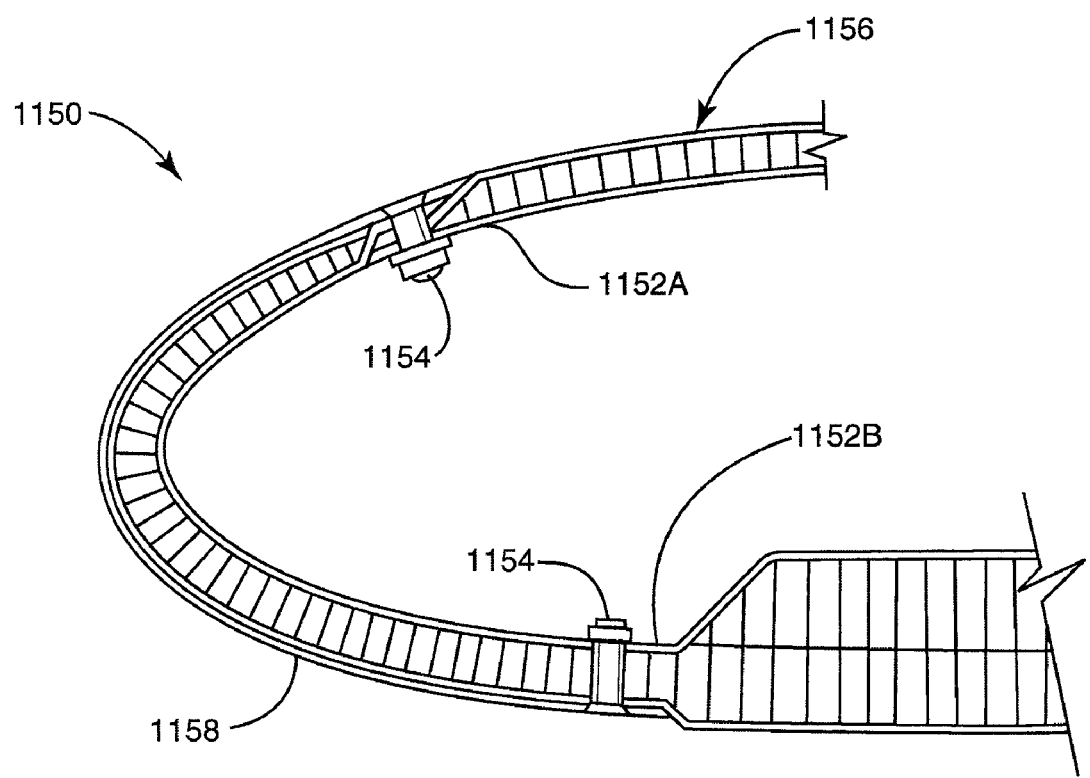

In a further variation shown in FIG. 9C, an inlet lip 1150 is selectively attachable and detachable to a first flange portion 1152A and a second flange portion 1152B of a nacelle body 1156. In particular, the inlet lip 1150 is provided with means to attach the inlet lip 1150 to the flange portions 1152A, 1152B of the nacelle body 1156. These means may include bolts 1154, mating bolt holes 1158 formed in an aft flange area of the inlet lip 1150, and aligned complementary bolt holes formed in the flange portions 1152A, 1152B. Thus, the nacelle 1156 comprises an inlet lip 1150 including a composite outer skin 1158 having an embedded conductive sheet therein (not shown in FIG. 9C), the inlet lip 1150 being selectively attachable to, and detachable from, the remainder of the nacelle 1156.

Figure 9D:
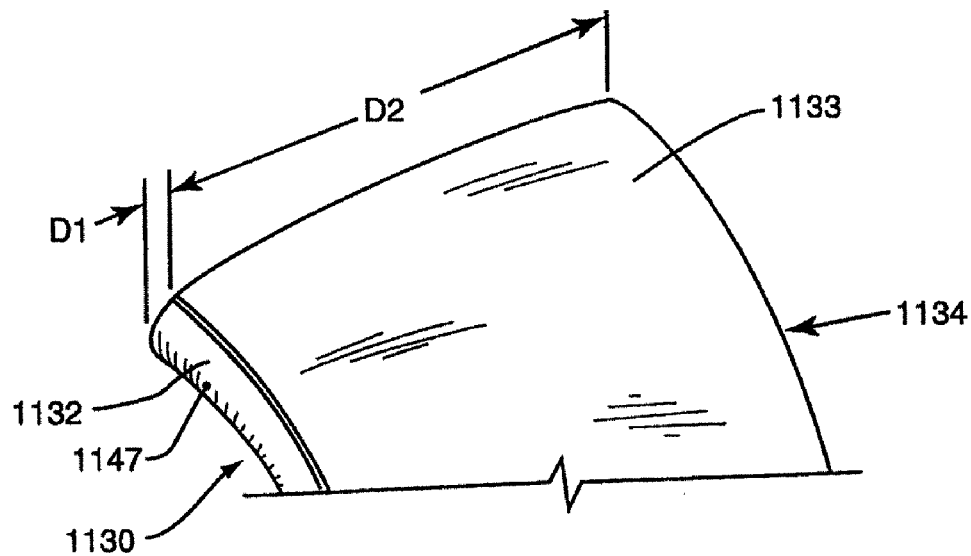
Figure 9E:
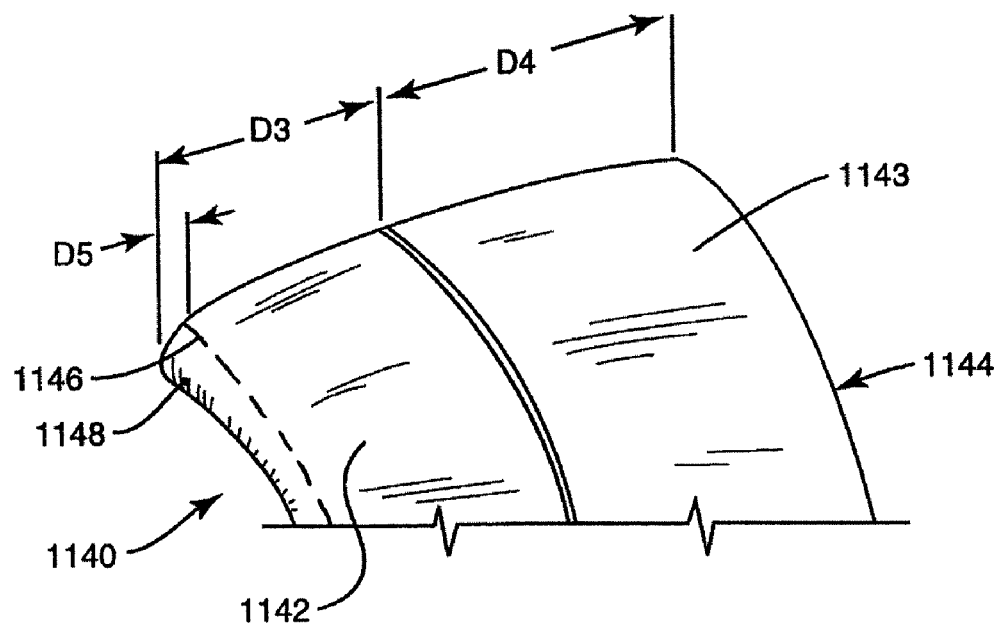

Another variation can be seen by comparing FIGS. 9D and 9E. In FIG. 9D, the outer barrel portion of the outer skin 1132 has a short axial length D1 (axial length D1 taken in a rearward direction from the highlight 1147) relative to the axial length D2 of the balance 1133 of the nacelle 1134. In contrast, as shown in FIG. 9E, the outer barrel portion of the outer skin 1142 has a longer axial length D3 (axial length D3 taken in a rearward direction from the highlight 1148) compared to axial length D1, the axial length D3 of the outer barrel portion being roughly the same as the axial length D4 of the balance 1143 of the nacelle 1144. In FIG. 9E, the outer barrel portion 1142 also has a greater axial length D3 than the axial length D5 (axial length D5 being taken from the highlight 1148) of the inner barrel portion 1146 (whose axially rearward most extent is depicted in phantom). In one embodiment, the axial length of the outer barrel portion 1142 is more than twice as great as that of the inner barrel portion 1146 (i.e., D3/D5>2). The significance of the embodiment shown in FIG. 9E is that the balance 1143 of the nacelle is a substantial distance D3 from the leading edge of the inlet lip 1140. This placement of the aft edge of the outer barrel portion 1142 of the inlet lip facilitates desirable laminar airflow over the surface of the nacelle 1144, thereby reducing drag.

The assembly of the inlet lip 800 of FIG. 5 is described below.

First, it should be evident from the foregoing description that a number of component layers must be bonded together to form the inlet lip 800. For instance, when present, the erosion shield 870 and the lighting prevention sheet 860 are bonded to the outer skin 820. The outer skin 820, in turn, is bonded at its inner barrel portion 824 to the core assembly 840, and at its leading edge portion 826 to the structural cellular core 850. Finally the acoustic cellular core 840 and the structural cellular core 850 are bonded to the inner skin 810, and the closeout section 814 is bonded to the outer skin 820 and to the inner skin 810.

Figure 10:
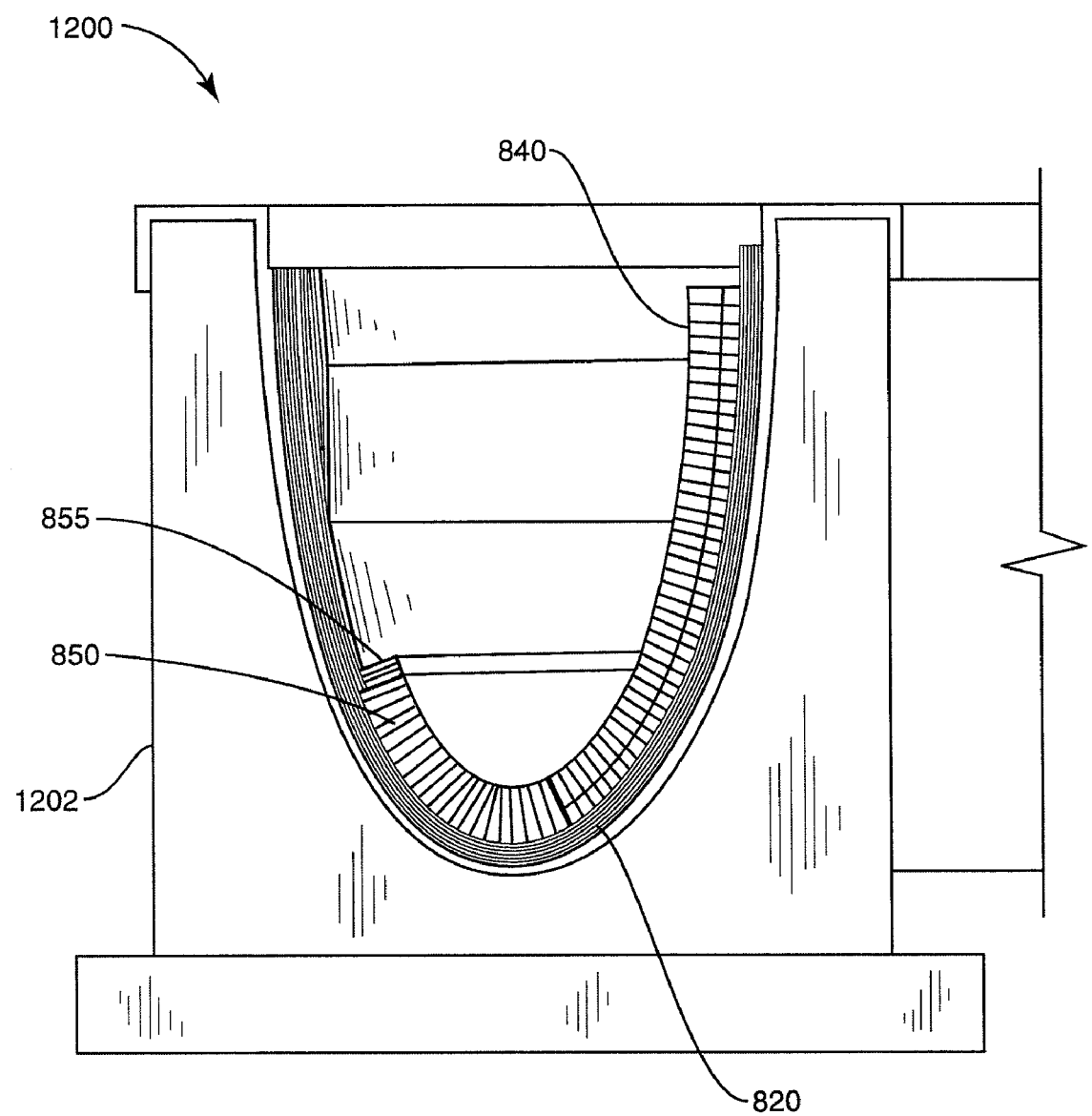
FIG. 10 is an elevation view of an end portion of a tool used to form a contoured composite laminate inlet lip according to the invention.

FIG. 10 shows a lay-up tool 1200 into which a number of component layers have been positioned during a lay up process. In one embodiment, the lay-up tool 1200 is a semicircular member having a generally V-shaped or generally U-shaped cross-section defining an open-topped channel 1202. The tool 1200 is used to form a first circumferential segment of the inlet lip 800. In one embodiment, the first circumferential segment subtends about 180° of the total circumference of the inlet lip 800. Similarly, a second tool (not shown), may be used to form a second circumferential segment of the inlet lip 800, the second circumferential segment also subtending about 180°. Once formed, each end of the two composite circumferential segments (each of which is an inlet lip half) is trimmed, and the two half-segments are mated to form a complete 360-degree unit. The mating ends of each half-segment can be joined in a conventional manner to form the complete inlet lip 800. It is understood that the first and second lay-up tools, though at least similar, are not necessarily identical, since the inlet lip 800 may or may not be rotationally symmetric about a central axis in all inlet lip designs.

Figure 11:
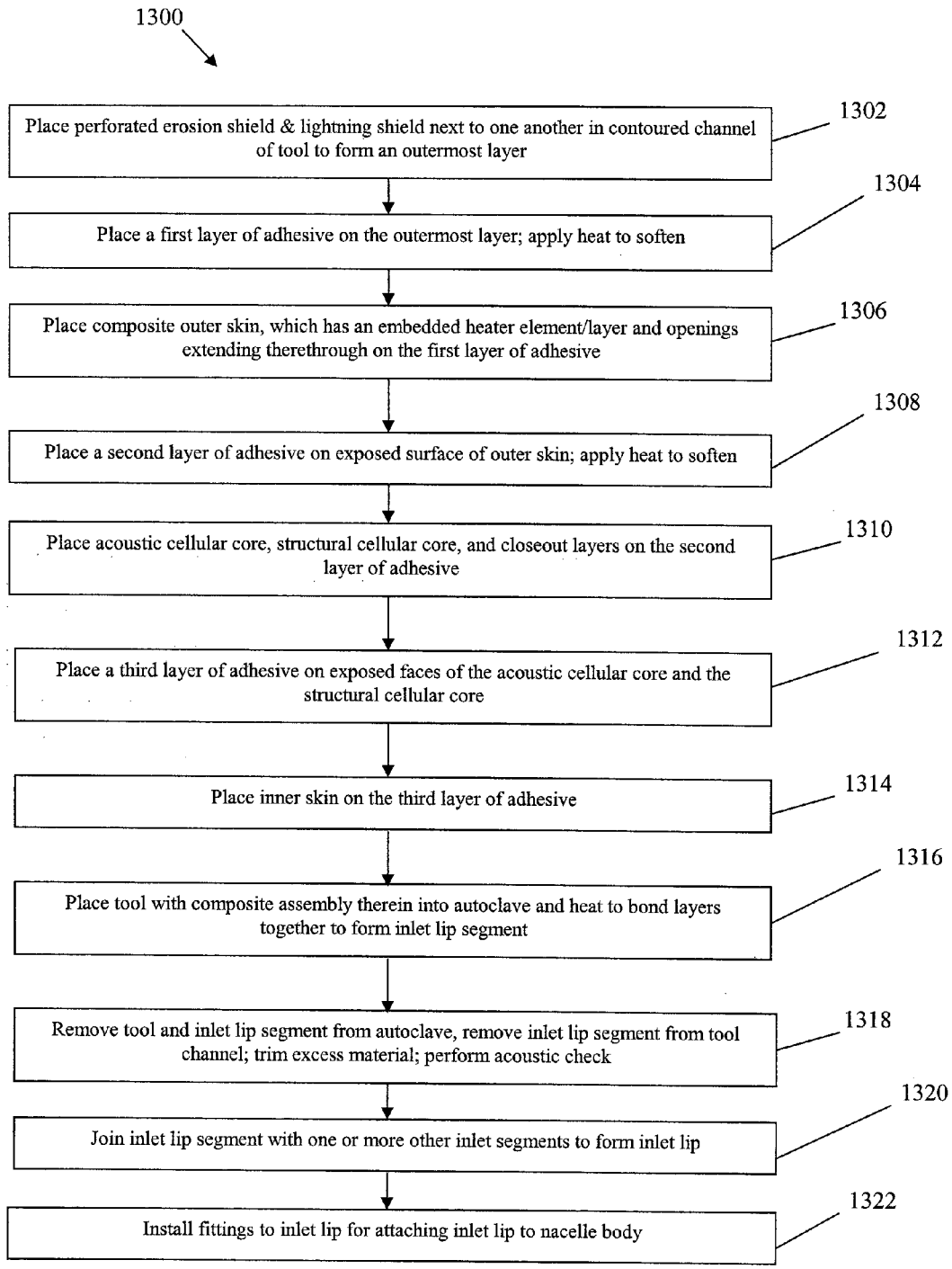
FIG. 11 shows a process flow for forming an inlet lip using the tool of FIG. 10.

FIG. 11 presents a process diagram 1300 detailing the principal steps in forming an inlet lip 800. In step 1302, a lightning shield 860 and a perforated erosion shield 870 are placed in the channel 1202. In one embodiment, the lightning shield 860 and erosion shield 870 are placed in the channel 1202 in a non-overlapping arrangement. Together, the lightning and erosion shields 860, 870 occupy substantially the entire extent of the channel 1202. At this stage, the erosion shield 870 includes the third set of openings preformed therein.

In step 1304, a first layer of adhesive is applied on the inner surfaces of the lightning shield 860 and the perforated erosion shield 870. A heat source, such as a heat gun, may be used to soften the first layer of adhesive. In step 1306, the composite outer skin 820, already having the second set of openings formed in its inner barrel portion, is placed on the lightning shield 860 and the perforated erosion shield 870.

In step 1308, a second layer of adhesive is applied on the exposed inner surface of the outer skin 820. A heat source, such as a heat gun, may used to soften the second layer of adhesive.

In step 1310, consistent with the embodiment shown in FIG. 5, the acoustic cellular core 840, the structural cellular core 850, and the closeout core 855 are positioned atop the composite outer skin 820. In one embodiment, a foaming or foamable adhesive is applied between adjoining edges of the open cell core sections 840, 850 in a manner well known in the art. Alternatively, other methods may be employed to join the adjoining edges of the cellular cores 840, 850.

In step 1312, a third layer of adhesive is applied on the exposed inner surfaces of the cores 840, 850 in a manner known to those skilled in the art. A heat source, such as a heat gun, may be used to soften the third adhesive layer.

In step 1314, the composite inner skin 810 is placed on the third layer of adhesive.

In step 1316, the tool 1200 and the composite assembly therein are placed in an autoclave to cure the various layers together and form a circumferential inlet lip segment. Preferably, the laid up layers are pressed in the channel 1202 of the tool 1200 during heating in the autoclave such that the layers substantially conform to the contour of the channel 1202 as they cure.

In step 1318, the tool 1200 and cured circumferential inlet lip segment is removed from the autoclave, allowed to cool, and removed from the tool 1200. The ends and edges of the inlet lip segment are trimmed to provide a desired configuration and finish. If desired, the inlet lip segment can be acoustically tested to check the noise attenuation properties of the inlet lip segment.

In step 1320, the mating ends of two circumferential segments are joined together to form a complete inlet lip 800. The adjoined ends of the two inlet lip segments are spliced or otherwise joined together using methods known to those of skill in the art.

Finally, in step 1322, any necessary fittings are installed on the inlet lip 800 for use in attachment to a nacelle body.

It is understood that a number of conventional steps have been omitted from process diagram 1300, for the sake of simplicity. These omitted steps include intermediate tests and quality checks, conditioning of the various composite layers, the use of intermediate release layers, the use of vacuum curing bags, and the like, all of which are known to those skilled in the art.

Various configurations and production methods of a composite aircraft surface structure having at least one embedded electric heating element and acoustic treatment for use in a composite nacelle inlet lip like that described above are described below.

Figure 12:
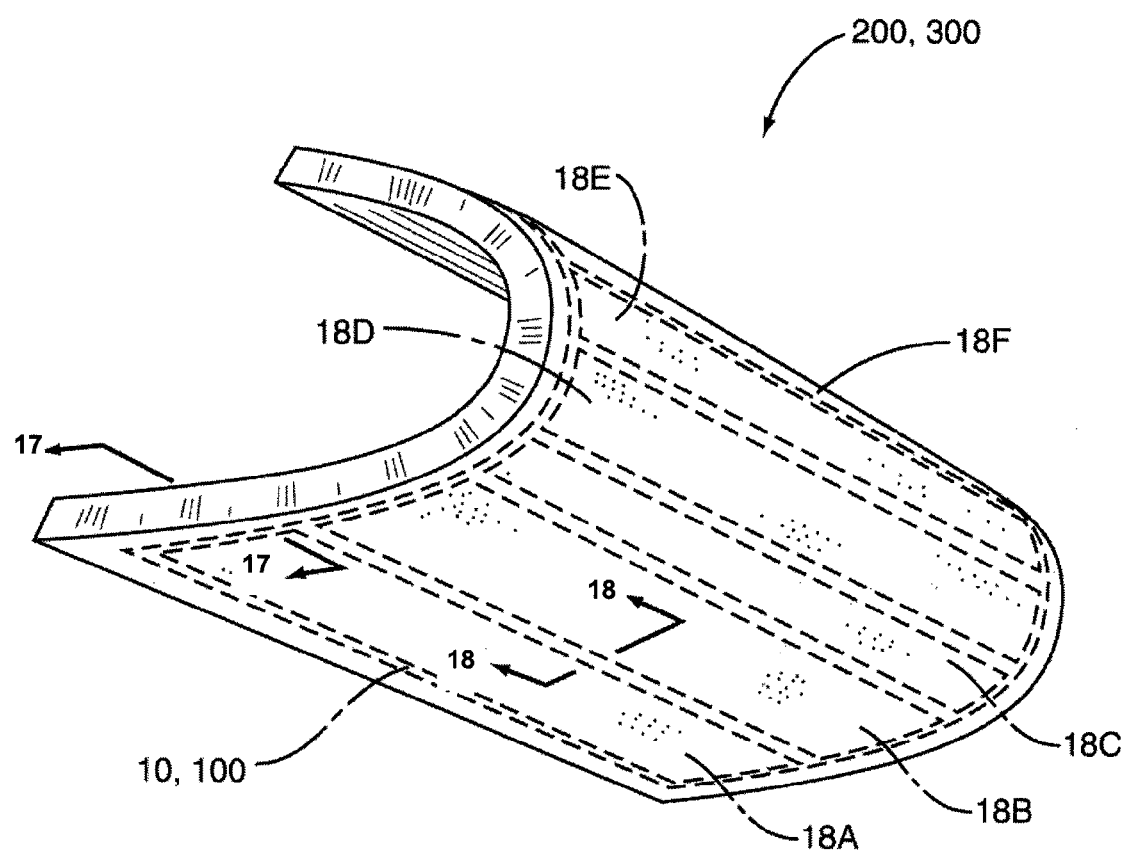
FIG. 12 is a perspective view of one embodiment of a composite structure for the leading edge of an aircraft that includes a composite ice protection heater apparatus according to the invention.

FIG. 12 shows a composite surface structure 200, 300 for the leading edge of an aircraft; In one embodiment, the composite surface structure 200, 300 is a segment of an aircraft engine nacelle inlet lip. For example, the composite surface structure 200, 300 can be at least a portion of nacelle inlet composite outer skin 820 like that described in detail above. In the embodiment shown, the surface structure 200, 300 includes a composite ice protection heater portion 10, 100. In the embodiment of FIG. 12, the composite heater portion 10, 100 is integrally incorporated into the composite surface structure 200, 300. As shown in FIG. 12, the heater portion 10, 100 may include a plurality of spaced electrical heater elements 18A-18F. The heater elements 18A-18F may be collectively or individually energized to prevent and/or eliminate ice formation on the leading edge of the structure 200, 300 during service.

Figure 13:
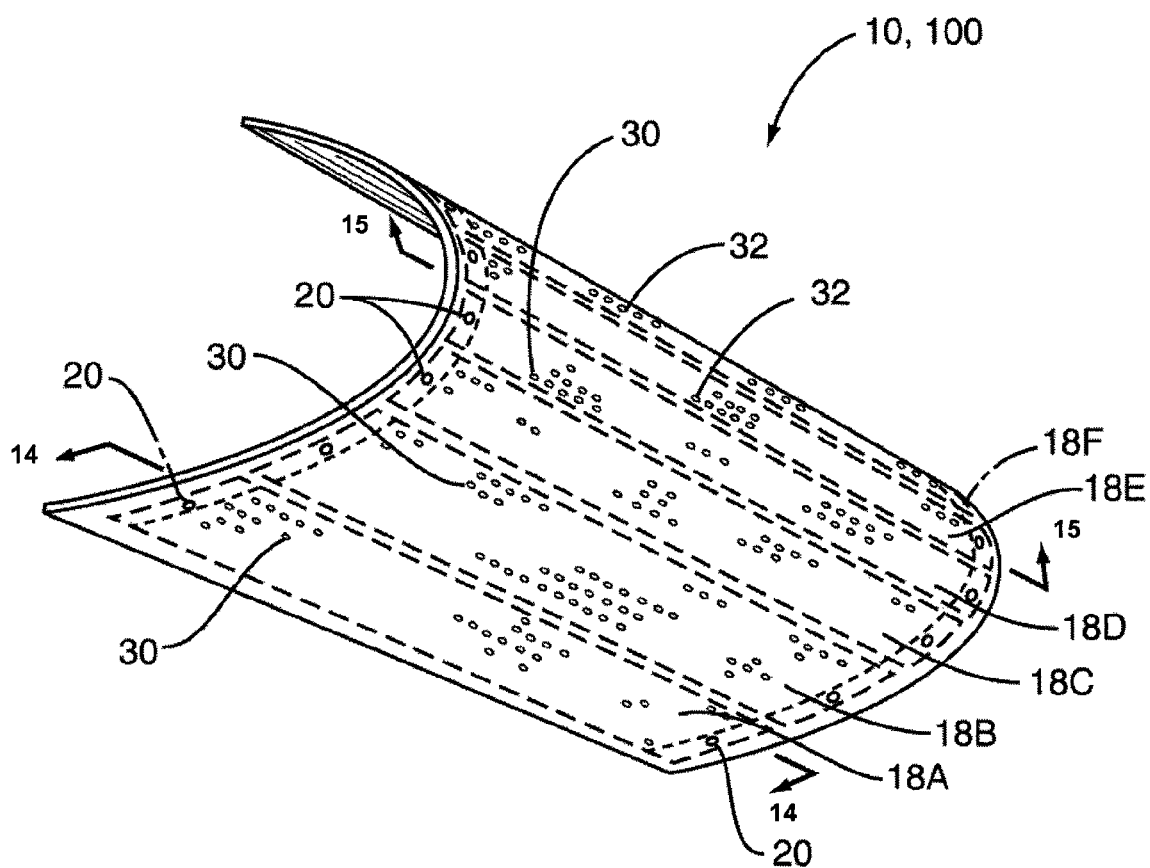
FIG. 13 is a perspective view of one embodiment of the composite ice protection heater apparatus portion of the composite structure shown in FIG. 12.

FIG. 13 shows one embodiment of a composite heater portion 10, 100 of the invention. The generally thin and generally flexible heater portion 10, 100 forms a moldable sheet capable of conforming to at least a portion of a surface contour of an external surface of an aircraft. The composite heater portion 10, 100 can be constructed such that the heater portion 10, 100 is substantially flat in an unrestrained state. Alternatively, the heater portion 10, 100 can be constructed such that the heater 10, 100 has a desired three-dimensional, non-flat shape in an unrestrained state (like that shown in FIG. 13, for example). In either embodiment, the composite heater portion 10, 100 is capable of conforming to an underlying aircraft support surface or structure, such as an inlet lip of an aircraft engine nacelle. For example, with reference to FIG. 5, the composite heater 10, 100 may form at least a portion of the outer skin 820, 822, 824, 826 of inlet lip 800.

As shown in FIG. 13, the composite heater portion 10, 100 can include a plurality of spaced openings 30 that extend through the entire thickness of the heater. The composite heater 10, 100 may also include at least some openings 32 that extend only partially through the thickness of the heater 10, 100. The spaced openings 30, 32 can serve two functions. First, the spaced openings 30, 32 may provide each heater element 18A-18F with a desired degree of electrical resistance, such that when energized, each heater element imparts a desired level of resistance heating to an associated surface of an aircraft. In addition, the spaced openings 30, 32 may act to attenuate at least some aircraft noise by absorbing or dissipating at least some acoustic energy at or near the surface of the heater 10. The spaced openings 30, 32 may have any desired size or shape, and may be arranged in any desired array or pattern in the composite heater portion 10, 100. In addition, the openings 30, 32 may be spaced over substantially the entire extent of the heater 10, 100, or may be provided in only select portions of the heater portion 10, 100. In the embodiment shown in FIG. 13, the heater portion 10, 100 includes six span-wise heating elements 18A-18F (indicated by dashed lines). In this embodiment, the full openings 30 are spaced over substantially all of heating elements 18A-18D, and the partial openings 32 are provided in heating elements 18E and 18F. As described in detail below, the full openings 30 can be provided in those heater elements 18 that are located in surface regions of the heater structure 10, 100 where at least some noise attenuation is desired. Conversely, partial openings 32 can be provided in those heater elements that are located in surface regions where noise attenuation is significant.

In one embodiment of the invention, the openings 30, 32 are holes that are about 2.5 mm in diameter, and are substantially equally spaced on about 3.8 mm centers. Accordingly, in this embodiment, the openings 30, 32 consume slightly less than about 30 percent of the total surface area of the heater assembly 10, 100. In other words, the openings 30, 32 define a POA of nearly 30 percent. Smaller or larger hole diameters and center spacings, as well as percentages of POA also may be used, as desired.

Figure 14:
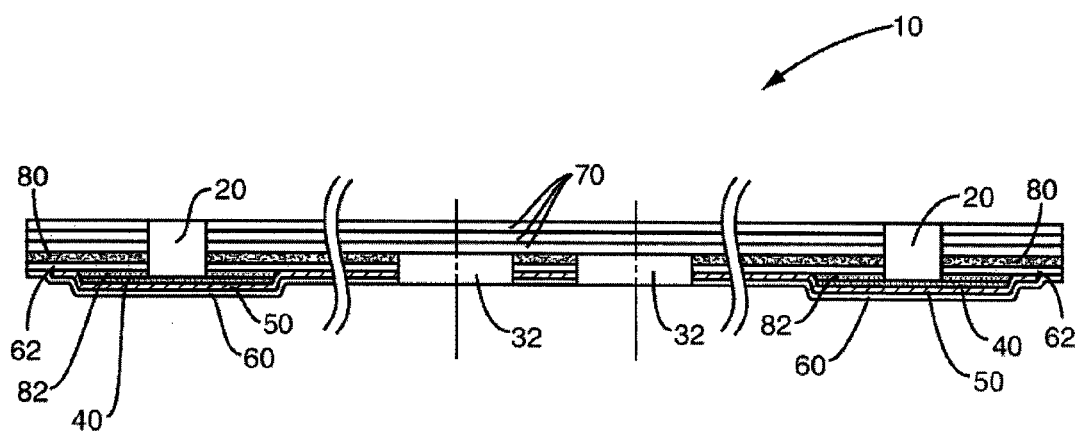
FIG. 14 is a cross section of the composite heater apparatus of FIG. 13 as taken along line 14-14 in FIG. 13.
Figure 15:
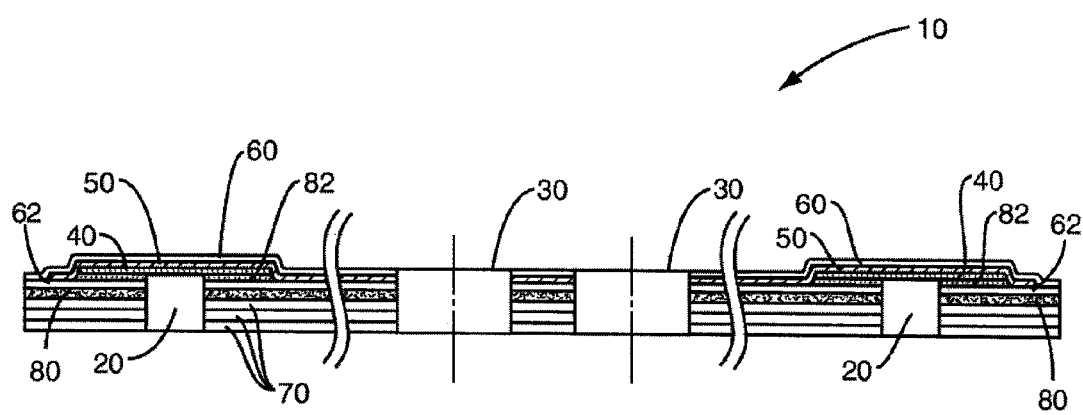
FIG. 15 is a cross section of the composite heater apparatus of FIG. 13 as taken along line 15-15 in FIG. 13.
Figure 16:
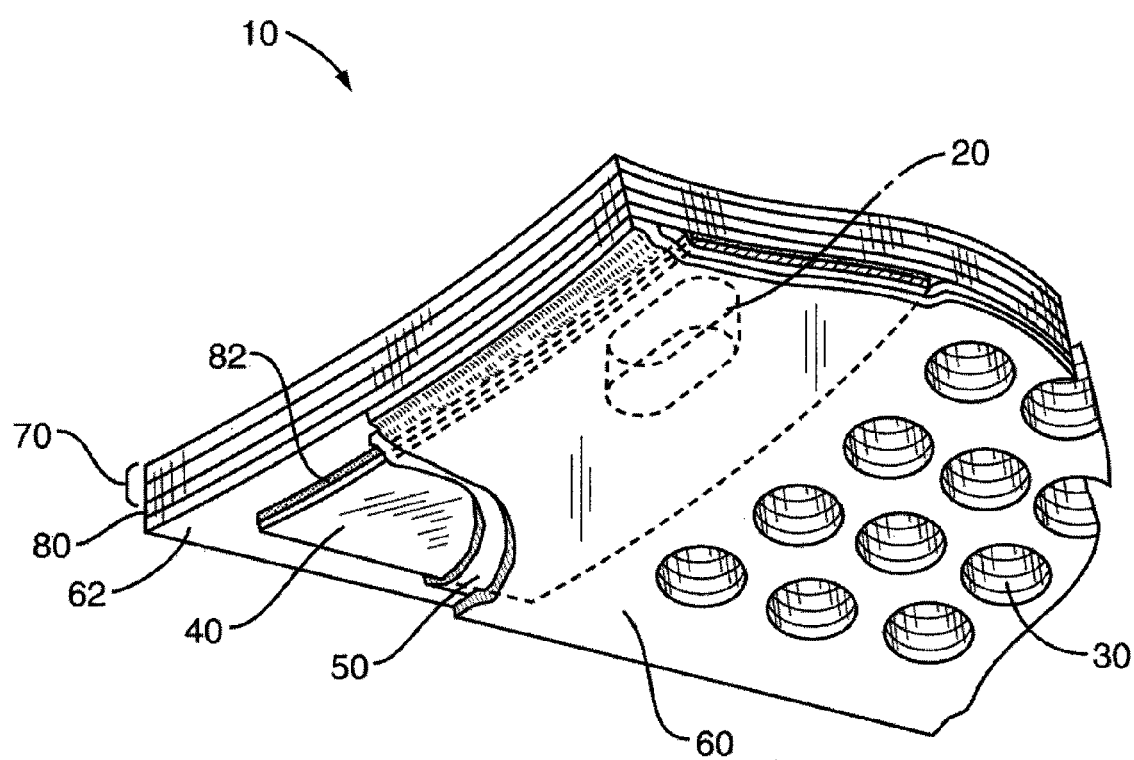
FIG. 16 is a perspective view of a portion of the composite heater apparatus of FIG. 13 showing layers of one embodiment of the composite structure.

FIGS. 14-16 show enlarged details of one representative laminated composite construction of a heater portion 10 like that shown in FIG. 13. In this construction, the heater portion 10 includes at least one outermost electrically insulating layer 60 covering at least one underlying electrically conductive layer 50. The outermost insulating layer 60 may include one or more plies of low dielectric glass cloth that are pre-impregnated with a suitable curable resin. Suitable resins include, but are not limited to, epoxy resins, cynate esters, phenolic resins, bismaleimide (BMI) resins, polyimide resins, and the like. The type of curable resin used may be based upon the maximum anticipated service temperature of the heater portion 10. For example, phenolic resins may be used for maximum service temperatures up to about 107° C., cynate esters for temperatures up to about 121° C., epoxy resins for temperatures up to about 149° C., BMI resins for temperatures up to about 204° C., and polyimide resins for temperatures up to about 288-343° C. For example, the insulating layer 60 may include one or more plies of Style 120 pre-impregnated woven E-glass fabric of a type that is well known in the art. Alternatively, the insulating layer 60 may include one or more plies of Style 7781 E-glass woven fabric prepreg, of a type that is well known in the art. Alternatively, the electrically insulating layer 60 may be constructed of any other suitable electrically insulating material. Suitable electrically insulating layers 60 preferably have a dielectric constant less than or equal to about 7, and a dielectric tangent less than or equal to about $12 \times 10^{-4}$ at a frequency of about 1 MHz at room temperature.

Preferably, the electrically conductive layer 50 is a sheet that includes a carbon-based material such as graphite fibers. For example, the sheet 50 may be a single layer of an electrically conductive woven or unidirectional graphite fabric or tape impregnated with a suitable curable resin. Suitable resins include, but are not limited to, epoxy resins, cynate esters, phenolic resins, bismaleimide (BMI) resins, polyimide resins, and the like. The type of resin used may be selected based upon the maximum anticipated service temperature of the heater 10, as described above regarding the insulating layers 60. Alternatively, the electrically conductive layer 50 may include plural layers of electrically conductive woven and/or unidirectional graphite fabrics or tapes. For example, the electrically conductive layer 50 may include a first layer of a woven graphite fabric, and a thinner second layer of unidirectional graphite tape. A combination of plural layers of woven and/or unidirectional non-woven graphite fabric sheets or tapes may be used to yield an electrically conductive layer 50 having desired electrical characteristics, such as electrical resistance.

Alternatively, the electrically conductive layer 50 may be any substantially continuous conductive material that is capable of conducting an electric current when subjected to an electric potential, and that is capable of receiving a plurality of spaced openings therethrough without adversely affecting the material's ability to conduct an electric current. Other materials with these characteristics are known to persons skilled in the art.

Figure 17A:
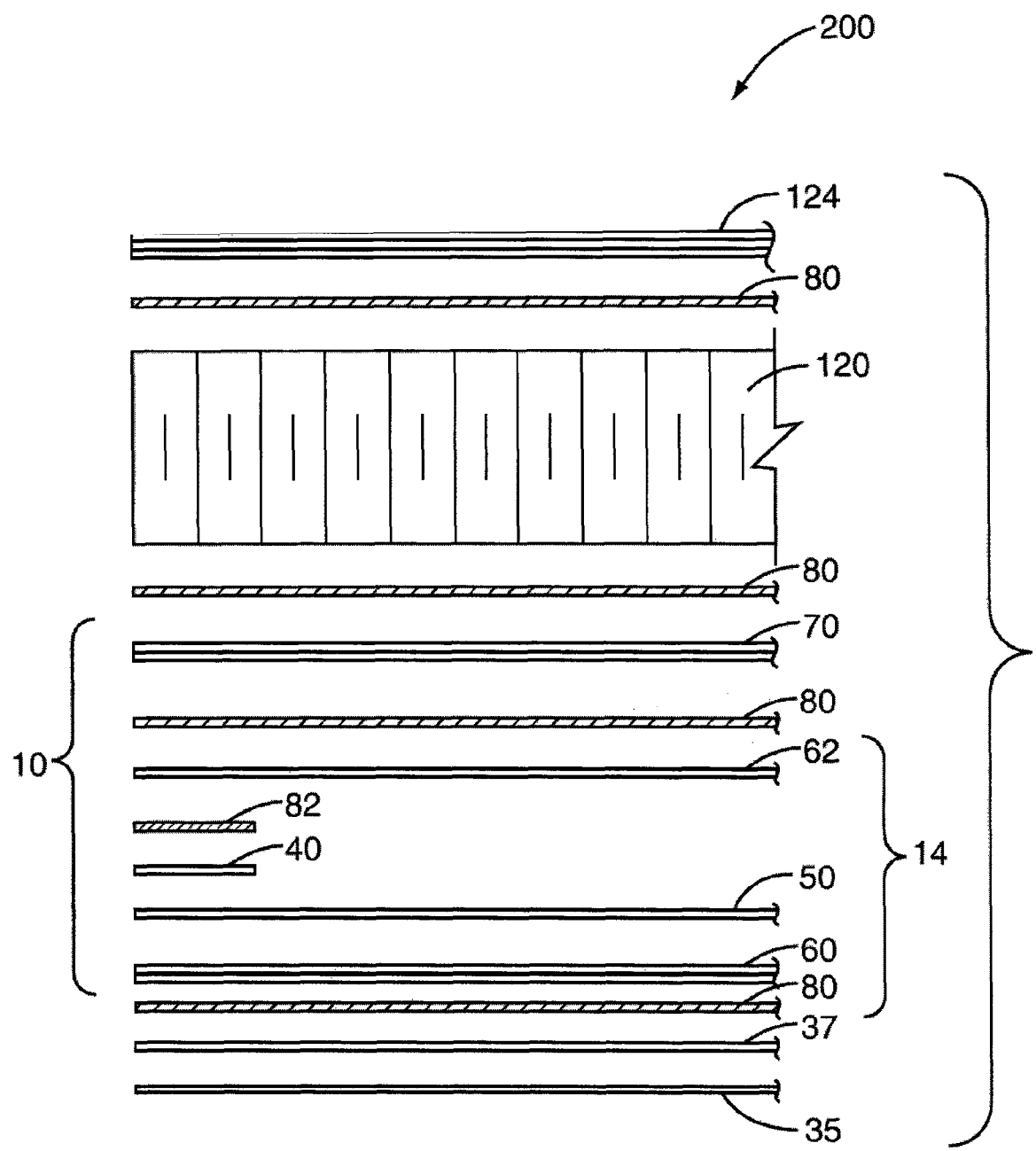
FIG. 17A is an exploded cross sectional view of one embodiment of the composite structure of FIG. 1 as taken along line 17-17 in FIG. 12, showing details of the composite construction.
Figure 17B:
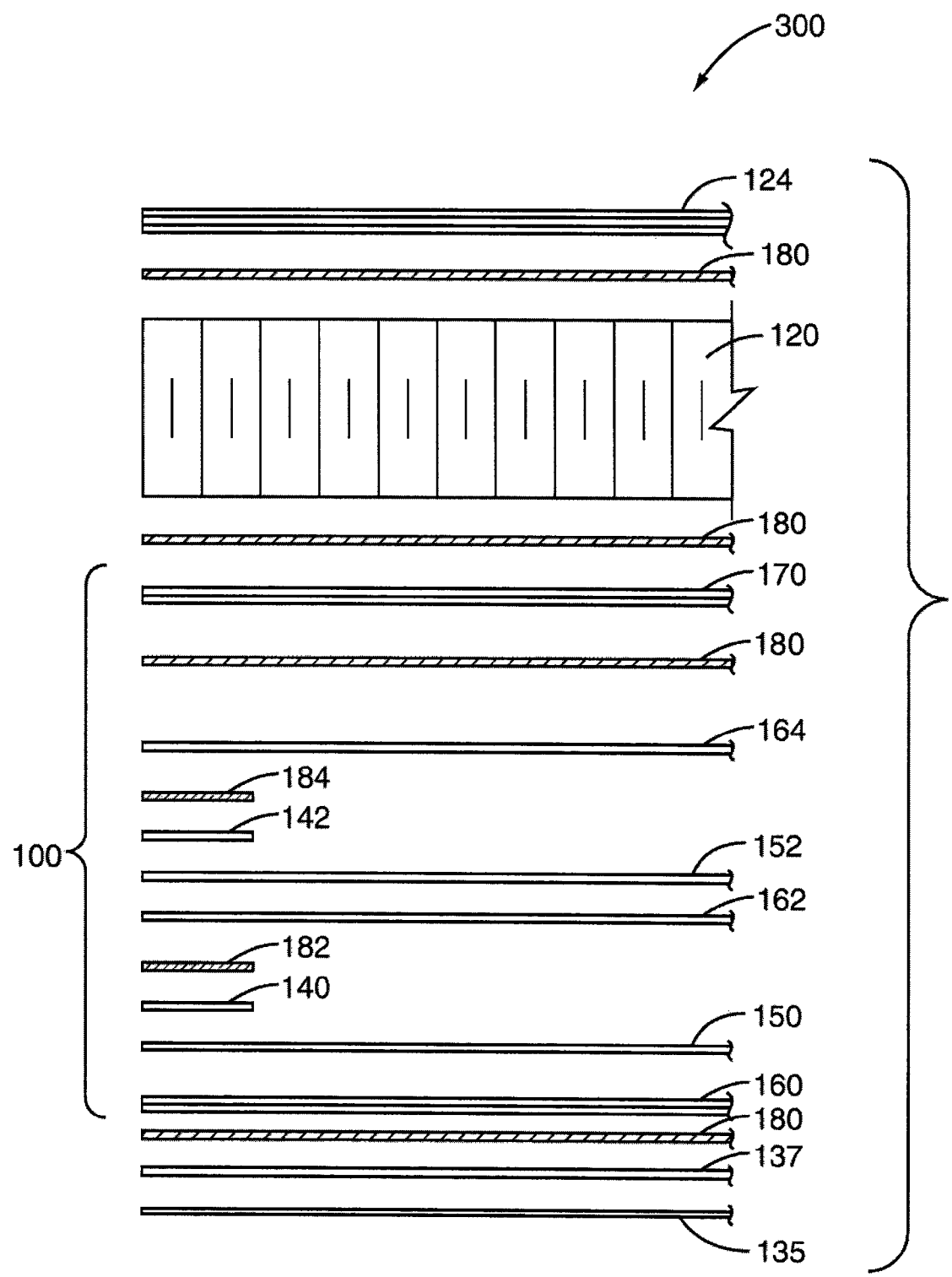
FIG. 17B is an exploded cross sectional view of another embodiment of the composite structure of FIG. 12 as taken along line 17-17 in FIG. 12, showing details of the composite construction.
Figure 18A:
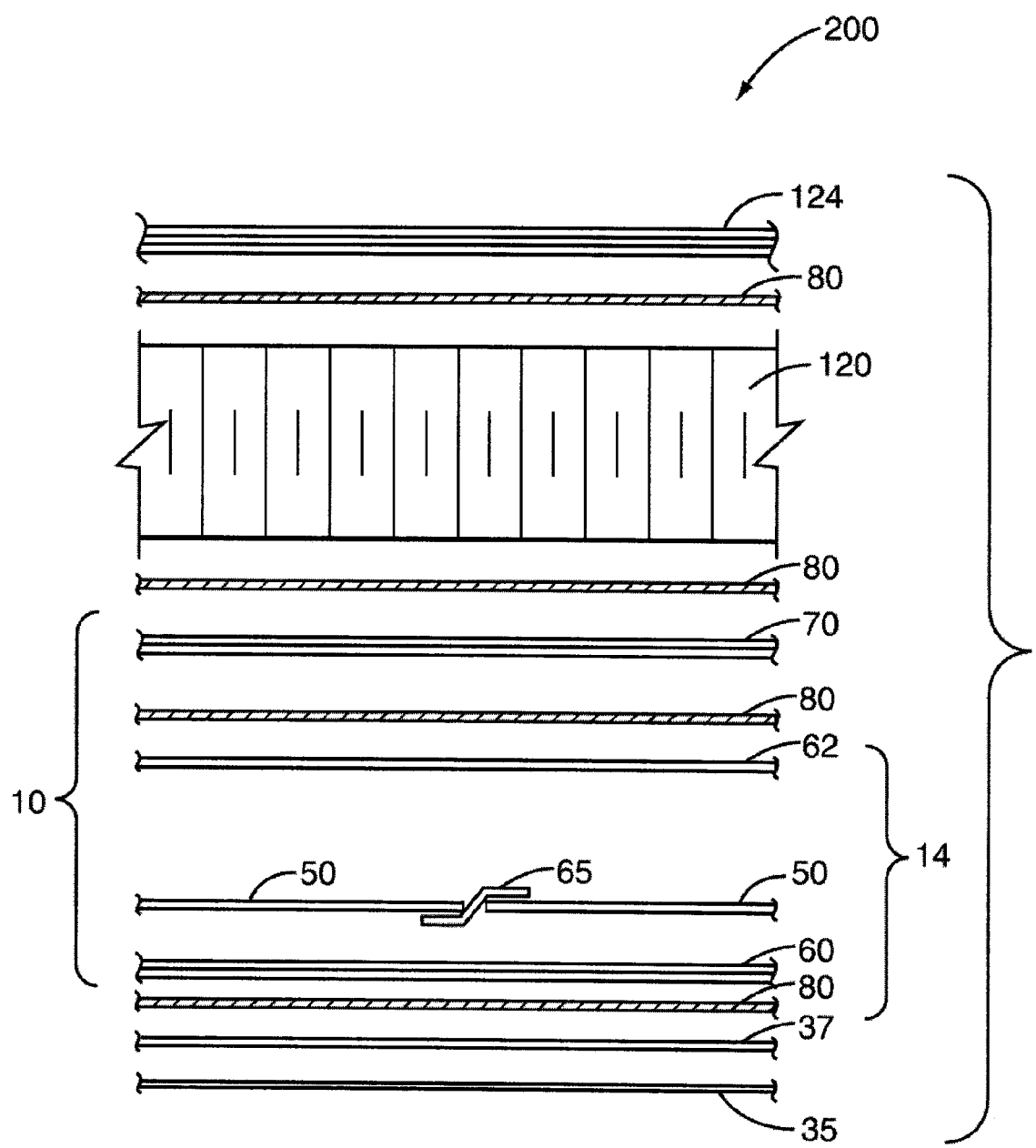
FIG. 18A is an exploded cross sectional view of the embodiment of the composite structure of FIG. 17A as taken along line 18-18 in FIG. 12, showing layers of the composite construction.
Figure 19:
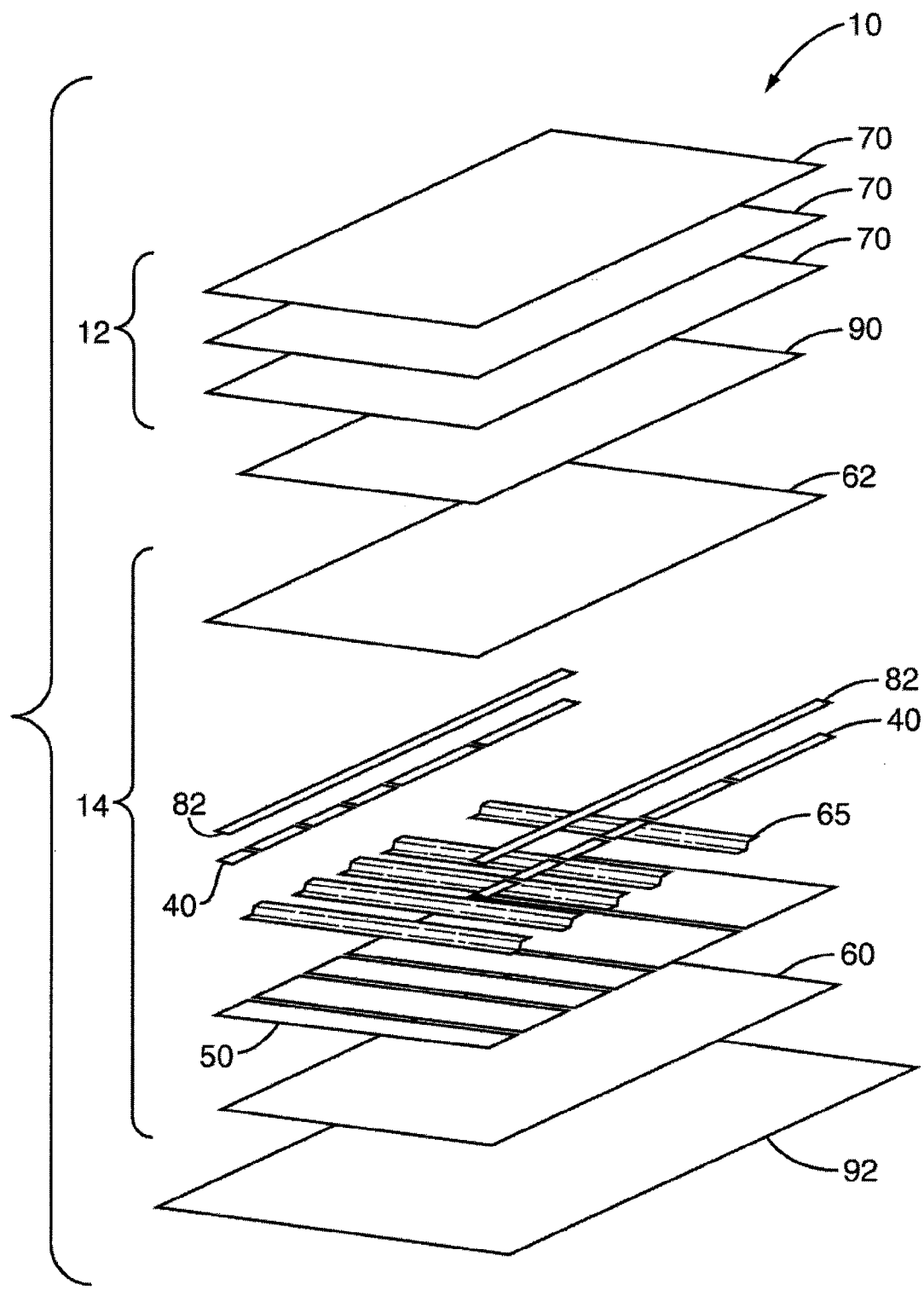
FIG. 19 is an exploded perspective view of the composite heater apparatus of FIGS. 13-17A and 18A showing a lay-up sequence for the composite structure.

As shown in FIGS. 14-16, 17A, 18A and 19, at least one first electrically conductive bus strip 40 is positioned in electrical contact with at least a portion of the electrically conductive sheet 50 proximate to one edge of the sheet 50. As described in detail below, at least one second electrically conductive bus strip 40 is in electrical contact with an opposed portion of the electrically conductive sheet 50 proximate to an opposed edge of the sheet 50. When the electrically conductive sheet 50 includes at least one non-woven electrically conductive fabric sheet having unidirectional electrically conductive threads, the first and second bus strips 40 preferably are placed in electrical contact with opposed edges that correspond to opposed ends of the unidirectional threads. Preferably, the bus strips 40 extend along substantially the full length of the respective opposed edges of the conductive sheet 50. The opposed bus strips 40 permit an electric potential to be substantially uniformly established across the electrically conductive sheet 50 by connecting the bus strips 40, 42 to a suitable power source. Preferably, the bus strips 40 are highly conductive metal strips, such as thin strips of copper or the like. As shown in FIGS. 14-16, 17A, 18A and 19, at least one second electrically insulating layer 62 underlies the conductive sheet layer 50 and the bus strips 40. The second insulating layer 62 may be a layer of pre-impregnated low-dielectric glass fabric such as a single ply of Style 120 or Style 7781 E-glass/epoxy fabric, or any other suitable electrically insulating material. Accordingly, the conductive sheet 50 and bus strips 40 are encapsulated between the insulating layers 60, 62. As shown in FIGS. 14-17A, and in order to minimize the possibility of delamination during service, strips of adhesive material 82 may be disposed between the bus strips 40 and the second insulating layer 62. The strips of adhesive material 82 enhance bonding between the bus strips 40 and the insulating layer 62 after curing. For example, the strips of adhesive material 82 may be strips of FM-300 epoxy adhesive film, available from Cytec Industries, Inc. Hereinafter, the combination of the insulating layers 60, 62, conductive layer 50, bus strips 40, and adhesive strips 82 are collectively referred to as the heater element layers 14 (as shown in FIGS. 17A, 18A and 19).

As shown in FIGS. 18A and 19, the electrically conductive layer 50 may include a plurality of spaced conductive sheets 50. Each of the spaced conductive sheets 50 may form one of a plurality of separate heating elements, such as heating elements 18A-18F as shown in FIGS. 12 and 13. Preferably, adjacent edges of adjacent conductive sheets 50 are sufficiently spaced apart to prevent electrical current from passing between adjacent conductive sheets 50 during service. Alternatively, or in addition, as shown in FIGS. 18A and 19, inter-heater insulating strips 65 may be positioned between adjacent edges of adjacent conductive sheets 50 to electrically isolate adjacent conductive sheets 50 from each other. As shown in FIG. 18A, one edge of each inter-heater insulating strip 65 may extend beneath an edge of a first conductive sheet 50, and an opposed second edge of each insulating strip 65 may extend over an adjacent edge of an adjacent conductive sheet 50. The inter-heater insulating strips 65 preferably are strips of low dielectric glass prepreg fabric, such as Style 120 or Style 7781 fabric. Alternatively, other electrically insulating materials may be used for the insulating strips 65.

As shown in FIGS. 14-15, 16, 17A, 18A and 19, the composite heater portion 10 may further include one or more structural layers 70 beneath the heating element layers 14. The structural layers 70 support and reinforce the heating element layers 14, and help to maintain the heater portion 10 in a desired contour or shape. The structural layers 70 may be a plurality of stacked pre-impregnated glass/epoxy fabric layers, for example. The structural layers 70 may be adhered to the heating element layers 14 by a suitable layer or film of adhesive material 80. One suitable low-flow adhesive that may be used to form the adhesive layer 80 is a nitrile phenolic adhesive available from 3M Co., for example. Alternatively, the structural layers 70 may be adhered to the heating element layers 14 by bonding together pre-impregnated resins within the insulating layer 62 and within at least one of the structural layers 70 during an elevated-temperature curing cycle.

As shown in FIGS. 13, 15 and 16, the heater portion 10 further includes a plurality of spaced openings 30 that extend through the first insulating layer 60, the conductive sheet layer 50, the second insulating layer 62, and the structural layers 70. Though openings also can be provided through the bus strips 40, the bus strips 40 preferably are non-perforated. The openings 30 may provide the conductive layer 50 with a desired degree of electrical resistance, such that when an electrical potential is established across the opposed bus strips 40, a desired degree of thermal energy is emitted from the conductive sheet 50. In addition, as further discussed below, the openings 30 can provide the heater portion 10 and an aircraft surface structure 200 incorporating the heating device 10 with desirable noise attenuation characteristics. As shown in FIGS. 13-16, one or more attachment openings 20 may be provided to permit electrical connection of the bus strips 40 to a power source in a conventional fashion. In one embodiment, the aircraft surface structure 200 forms at least a portion of the outer skin 820 of a composite nacelle inlet lip 800 like that shown in FIG. 5.

The invention also includes a method of producing the heater portion 10 described above. The process includes assembling the layers of the composite heater structure 10 as shown in FIG. 19, for example. The composite lay-up and curing steps and processes generally described herein are well known in the art. In a process according to the invention, the first insulating layer 60 can be laid over a layer of suitable peel ply material 92. The peel ply material 92 may be Code 60001 Peel Ply by Richmond Aircraft Products, Inc., for example. At least one sheet of conductive material 50 can be laid on the first insulating layer 60. Preferably, the first insulating layer 60 is oversized, such that excess material extends beyond the outer edges of the conductive sheets 50. When the heater apparatus includes plural sheets of conductive material 50 forming separate heater elements, the sheets 50 should be sized and spaced such that adjacent conductive sheets 50 do not contact each other. For single-phase heaters 10, pairs of opposed bus strips 40 can be placed along edges of the conductive sheets 50 as shown in FIG. 19. Preferably, the bus strips 40 are sized such that they extend along substantially the full lengths of the opposed edges of their respective conductive sheets 50. Alternatively, for three-phase systems, four separate bus strips 40 may arranged such that one bus strip forms a common ground on a first edge of a conductive sheet 50, and the other three "hot" bus strips 40 are spaced along an opposed second edge of the conductive sheet 50. The bus strips 40 may be overlaid with adhesive strips 82 to enhance bonding with adjacent layers. A second insulating layer 62 can be laid over the conductive sheets 50, bus strips 40, and adhesive strips 82, thus completing lay-up of the heater element layers 14.

In one embodiment of the process, in order to prevent the second insulating layer 62 from adhering to the structural layers 70, a release layer 90 can be laid over the second insulating layer 62. The release layer 90 may be a layer of porous Armalon™ by Du Pont, for example. Next, structural layers 12 comprising one or more reinforcement layers 70 can be laid over the heating element layers 14 and the release layer 90. The stacked layers 12, 14 then can be prepared for curing at an elevated temperature using methods known in the art. Preferably, the stacked layers 12, 24 are placed inside a vacuum bag to extract entrapped air from the lamination. Once the air has been excluded, pressure is applied to compress the stack, and the stack is subjected to elevated temperatures to cause the pre-impregnated epoxy resins to meld and cure.

As discussed above, the heater portion 10 may be generally flat in shape, or may have a desired three-dimensional contoured shape like that shown in FIG. 13. When a generally flat shape is desired, the stacked layers may be compressed between substantially flat platens during curing, for example. Similarly, when a non-flat, contoured shape is desired, the stack may be laid up and pressed within a suitably shaped mold 1200 like that shown in FIG. 10 to impart the desired three-dimensional shape to the lamination during curing.

Figure 21:
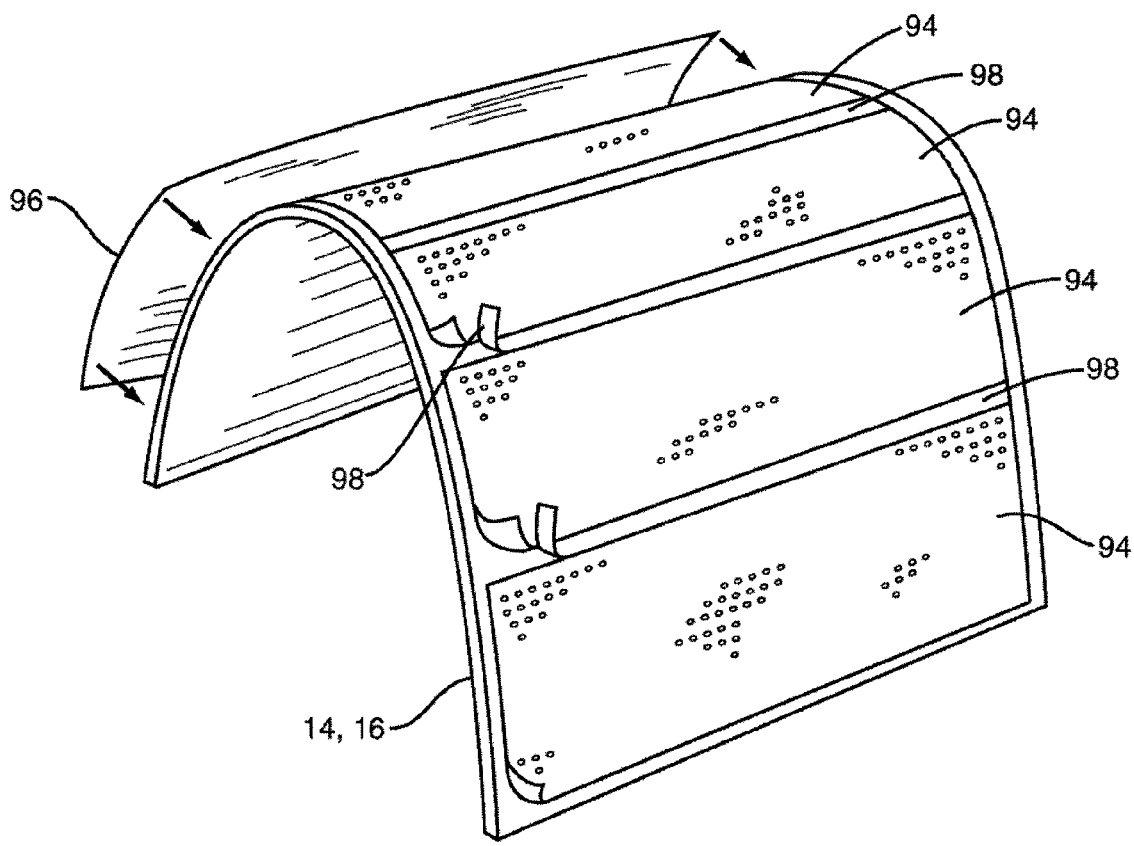
FIG. 21 is a perspective view of the composite structure shown in FIGS. 19-20 with sheets of maskant applied before perforating the composite structure.
Figure 22:
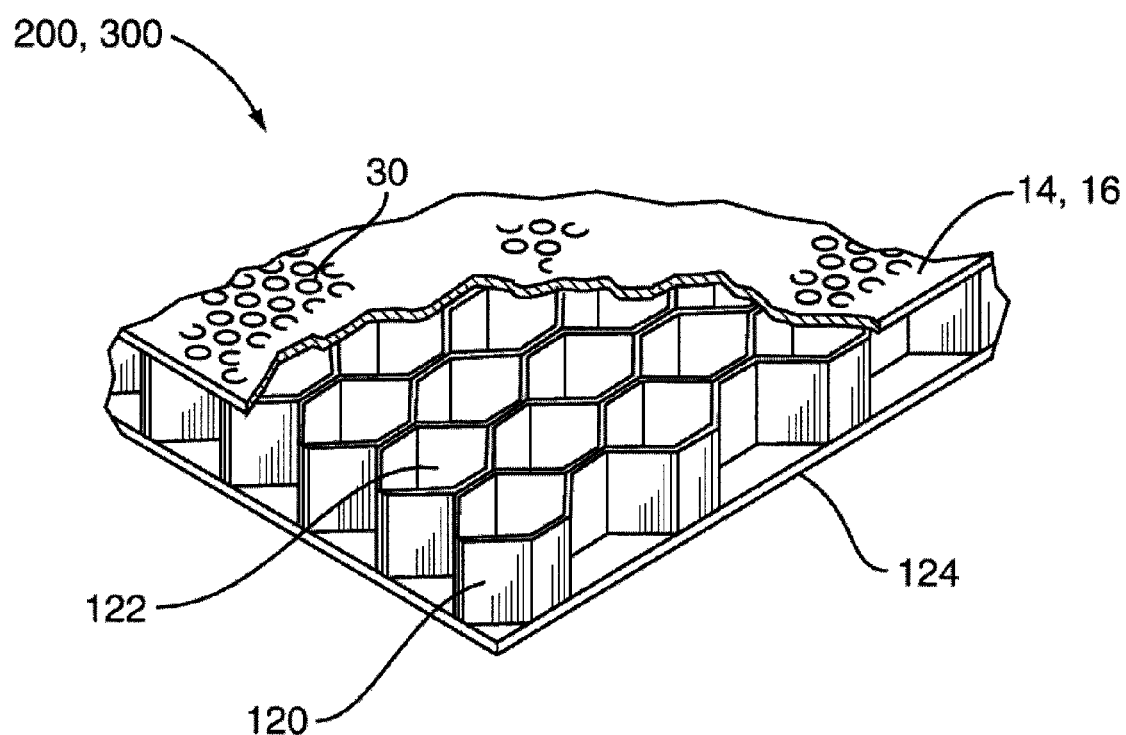
FIG. 22 is a perspective view of a portion of a perforated composite heater apparatus according to the invention assembled over an open-cell matrix.

After the lamination has been suitably cured, the cured composite can be removed from the mold and vacuum bag, and prepared for perforating. In a preferred process, sheets of perforated maskant 94 can be selectively placed over those portions of the stacked layers that are to be perforated, as shown in FIG. 21. Non-perforated sheets of maskant 96 and non-perforated strips of maskant 98 can be applied to those portions of the stacked layers that do not receive openings. The maskant sheets 94, 96 and maskant strips 98 may be a vinyl masking material available from Diamond Manufacturing, Co., or any other suitable masking material. Once the composite structure has been suitably masked, the masked surface is blasted with conventional techniques using an erosive media such as metal or ceramic particles, or another suitable erosive media. The erosive blasting is continued until the openings 30 extend through the full thickness of the stack at all exposed, non-masked locations. Though erosive blasting is a preferred method of forming the openings 30 in the stacked layers, other suitable perforation processes also may be used. For example, the openings 30 may be formed by mechanical drilling, laser drilling, electron beam drilling, chemical etching, or the like.

After blasting, the maskant 94, 96, 98 is removed, and the edges of the stacked layers can be trimmed to remove any excess material. Where a release layer 90 is included between the heater element layers 14 and the support layers 12, the release layer 90 is removed. Those portions of the heater element layers 14 protected by the non-perforated maskant 96 remain non-perforated after erosive blasting. When desired, a non-perforated region of the heater element layers 14 may be separately masked with a perforated maskant and blasted with an erosive material to perforate that region only with partial openings 32. In this way, at least some portions of the heater element layers 14 may include partial openings 32 that have no corresponding openings in matching portions of underlying support layers 12. These partial openings 32 may be desirable to modify the electrical resistivity of the conductive heating layer 50, without affecting the noise attenuation aspects of the invention. As shown in FIG. 13, such partial openings 32 may be provided in portions of a composite heater 10 where electrical resistance modification is required, but sound attenuation is less important or not required. For example, in the heater portion 10 shown in FIG. 13 for use in the nacelle nose lip segment 200 shown in FIG. 12, partial openings 32 may be provided in outermost heater elements 18E and 18F, since these outermost heater elements correspond to portions of the nacelle inlet lip that are relatively distant from and shielded from the noise-generating turbine blades of an associated aircraft engine.

As shown in FIGS. 17A and 18A, after perforating the stacked layers and trimming away any excess material, a layer of adhesive material 80 can be applied between the heater element layers 14 and the support layers 12 in such a manner that the adhesive material 80 does not substantially block the full openings 30. Corresponding openings 30 in the heating element layers 14 and support layers 12 are re-aligned with each other when the two sets of layers 12, 14 are bonded together by the adhesive 80. The layers 12, 14 are again placed in a suitable vacuum bag, and the adhesive 80 is cured at an elevated temperature to form a unitary heater structure 10. After the adhesive 80 is cured, the heater device 10 is finally trimmed of any remaining excess material.

Alternatively, where no release layer 90 is included between the heater element layers 14 and the support layers 12, no adhesive 80 is required, and the epoxy resins of the second insulating layer 62 and the adjacent support layer 70 can be bonded together during the initial curing cycle. Accordingly, the heater device 10 can be finally trimmed after the assembly has been perforated, thereby completing the heater device 10.

Figure 18B:
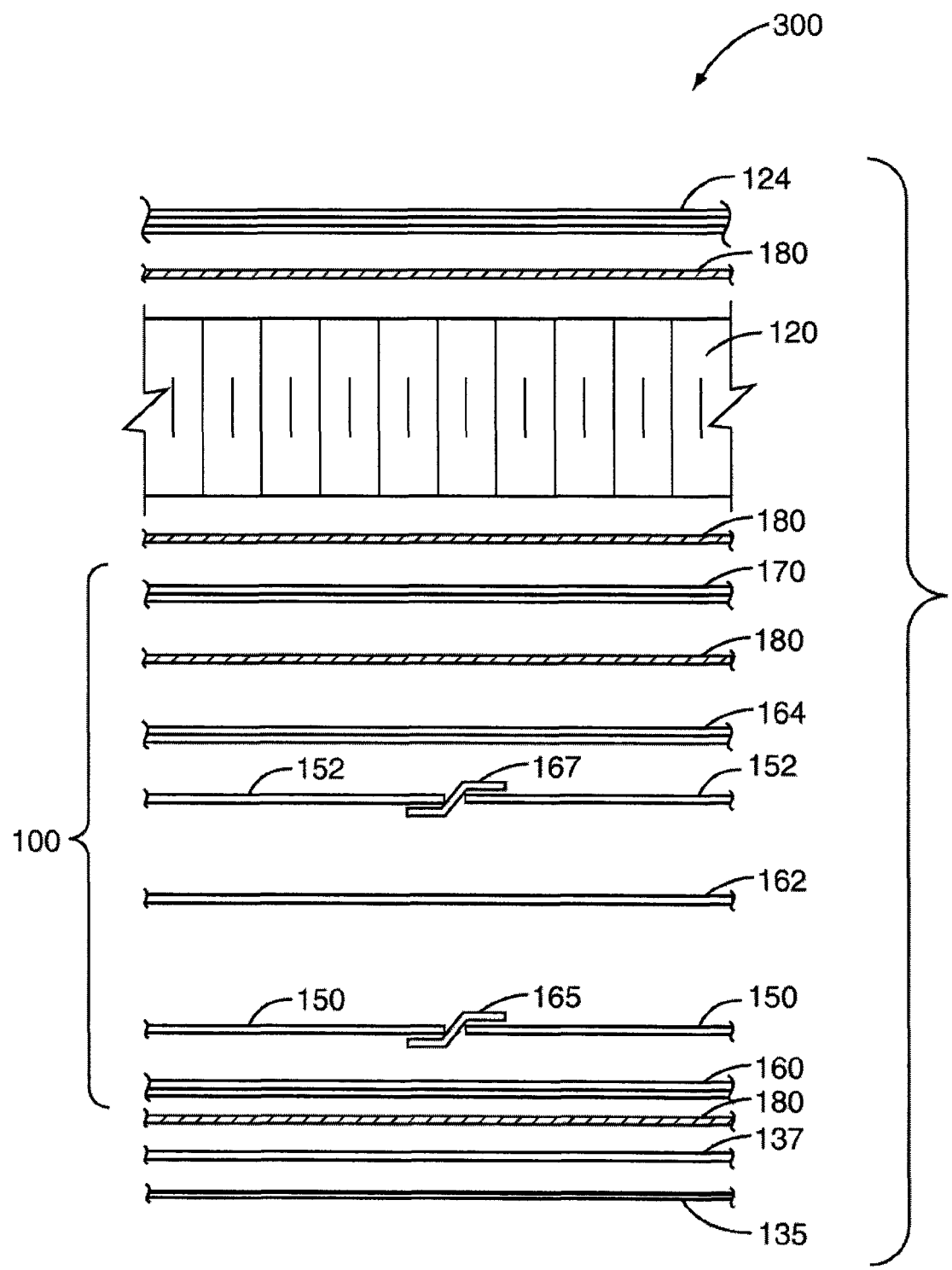
FIG. 18B is an exploded cross sectional view of the embodiment of the composite structure of FIG. 17B as taken along line 18-18 in FIG. 12, showing layers of the composite construction.
Figure 20:
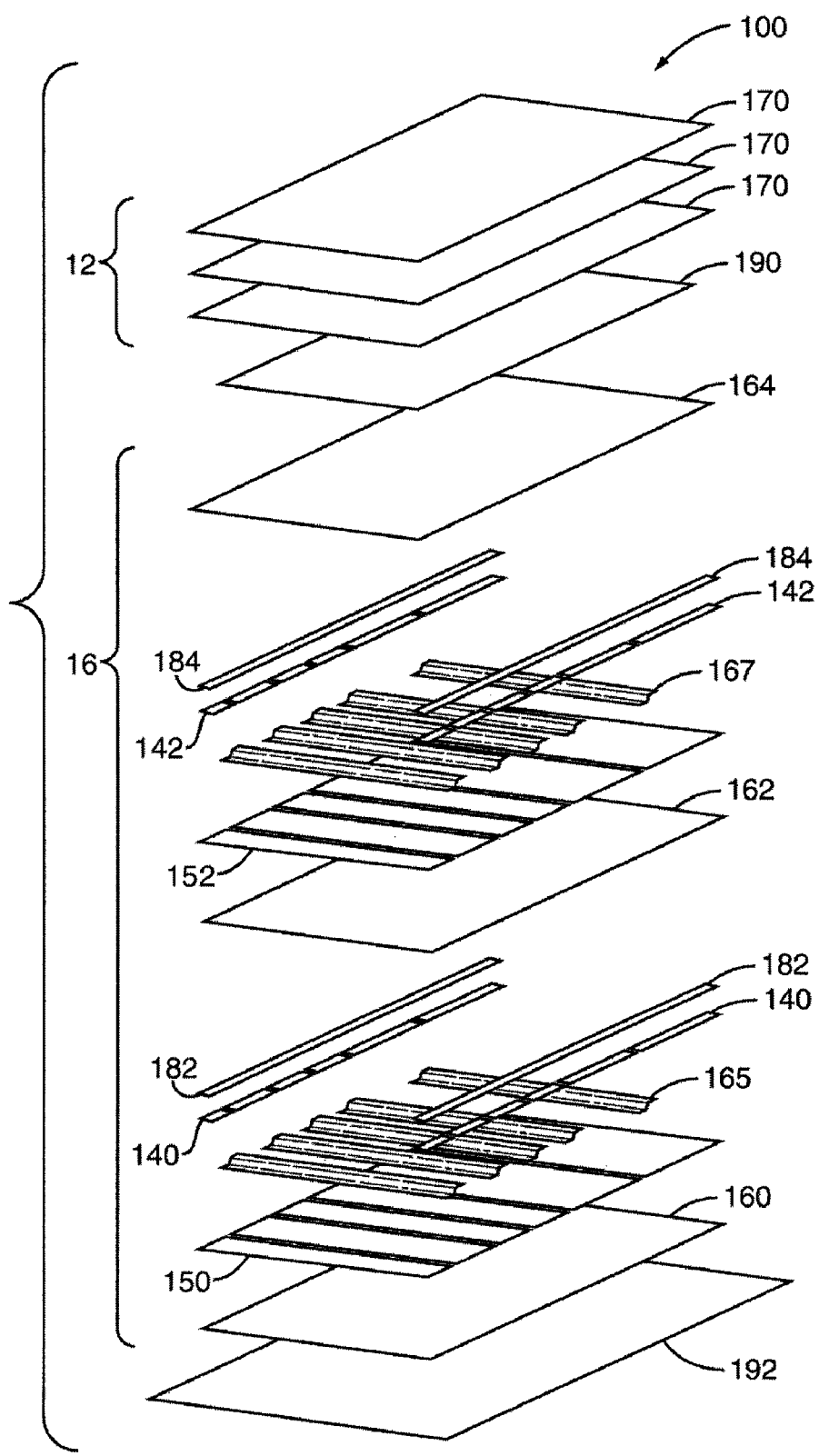
FIG. 20 is an exploded perspective view of the composite heater apparatus of FIGS. 13, 17B and 18B showing a lay-up sequence for the composite structure.

Another embodiment of a heater portion 100 according to the invention is shown in FIGS. 13, 17B, 18B and 20. In this embodiment, the heater portion 100 includes plural layers of electrically conductive sheets 150, 152 separated by one or more electrically insulating layers 160, 162. Though only two layers of conductive sheet layers 150, 152 are shown in FIGS. 17B, 18B and 20, the heater device 100 may include two or more layers of conductive sheets 150, 152, each separated by one or more insulating layers 160, 162 as desired. The overlapping conductive sheet layers 150, 152 may form redundant heating elements to provide backup heaters in the event one or more of the heating elements formed by one of the conductive sheets 150, 152 becomes inoperative. Alternatively, the heating elements formed by overlapping conductive sheet layers 150, 152 may be selectively energized in any desired combination to generate a desired level of heating from a particular region of the device 100. In addition, the overlapping conductive heater layers 150, 152 may be identically sized and positioned within the heater structure 10 as shown in FIG. 20, or may have different sizes and positions in the structure 10.

The heater portion 100 otherwise may be substantially similar to the heater portion 10 having a single conductive layer 50 as described above. As shown in FIGS. 17B and 20, electrically conductive bus strips 140, 142 are placed in contact with opposed portions of the conductive layers 150, 152 and permit an electrical voltage to be induced across the conductive heater layers 150, 152. As shown in FIG. 20, inter-heater insulating strips 165, 167 may be provided between adjacent edges of adjacent conductive sheets 150, 152 to minimize the possibility of an electric current passing between adjacent conductive sheets 150, 152 when the sheets are energized. As shown in FIGS. 17B and 20, and in order to minimize the possibility of delamination, strips of adhesive material 182, 184 may be disposed between the bus strips 140, 142 and the adjacent insulating layers 162, 164. The strips of adhesive material 182, 184 enhance bonding between the bus strips 40 and the insulating layer 62 during curing. Hereinafter, the combination of the insulating layers 160, 162, and 164, conductive sheet layers 150, 152, bus strips 140, 142, and adhesive strips 182, 184 are collectively referred to as the heater element layers 16 (as shown in FIG. 20).

The composite heater assembly 100 includes a plurality of spaced full openings 30 therethrough like those described above for heater portion 10. The composite heater assembly 100 also may include a plurality of spaced partial openings 32 like those described above for heater portion 10. As shown in FIG. 13, one or more attachment openings 20 may be provided in composite heater assembly 100 to permit electrical connection of the bus strips 140, 142 to a power source.

The invention also includes a method of producing the multi-layer heater portion 100 described above. In one embodiment, the process includes assembling the layers of the composite heater structure 100 as shown in FIG. 20. A first insulating layer 160 can be laid over a layer of peel ply material 192. At least one sheet of conductive material 150 can be laid over the first insulating layer 160. Preferably, the first insulating layer 160 can be sized such that excess material extends beyond the outer edges of the conductive sheets 150. When the heater portion 100 includes plural conductive sheets 150 forming separate heater elements, the sheets 150 can be sized and spaced such that the conductive sheets 150 do not contact each other. Alternatively, or in addition, inter-heater insulating strips 165 can be placed between adjacent conductive sheets 150 as shown in FIG. 18B. The inter-heater insulation strips 165 may be strips of pre-impregnated dielectric glass fabric, or any other suitable electrically insulating material. Pairs of opposed bus strips 140 can be placed along opposed edges of the conductive sheets 150 as shown in FIG. 20, for example. Preferably, the bus strips 140 are sized such that they extend along substantially the full lengths of the opposed edges of their respective conductive sheets 150. In order to enhance the bond between the bus strips 140 and an overlaid adjacent layer 162, adhesive strips 182, 184 may be placed over the bus strips 140, 142 as shown in FIGS. 17B and 20. Next, a second electrically insulating layer 162 can be laid over the layers of conductive sheets 150, bus strips 140, and adhesive strips 182. The lay-up process is continued by adding one or more additional insulating layers 162, one or more additional layers of conductive sheet layers 152, one or additional layers of inter-heater insulating strips 167, one or more additional layers of bus strips 142, one or additional layers of adhesive strips 184, one or more additional insulating layers 164, and so on. A release layer 190 and one or more structural support layers 170 can be laid over the final insulating layer 164. The stacked layers are placed inside a vacuum bag, and compressed and cured at an elevated temperature in the manner described above.

After curing, the composite structure is masked and perforated as described above regarding the single-layer heating device 10. After perforating, the release layer 190, is removed from the lamination, and the separate portions of the structure are adhered together by a suitable adhesive 180 as described above. Alternatively, the release layer 190 may be omitted during lay-up, thereby eliminating the need for adhesive. The heater assembly 100 is finally trimmed to remove excess material. Like the single layer heater device 10 described above, the multi-layer heater assembly 100 may be formed in a substantially flat state, or may be laid up and cured in a suitable mold to impart a desired three-dimensional shape to the heater device 100. For example, the heater device 100 may be molded to have a curved shape that conforms to a nacelle inlet lip, as shown in FIG. 13.

A heater portion 10, 100 according to the invention may be incorporated into a surface structure of an aircraft to provide ice protection, or to provide noise attenuation in addition to ice protection. In particular, the heater device 10, 100 can be incorporated into an aircraft engine nacelle inlet nose lip segment like that shown in FIGS. 5 and 9A-9C, for example. In one embodiment of the invention, the composite heater device 10, 100 is mounted over an open-cell matrix 120 with a suitable adhesive 80, 180 as shown in FIGS. 17A-18B and 22. The open-cell matrix 120 may be an open-cell honeycomb structure, any other suitable open-cell structure, or any combination thereof. For example, the open-cell matrix layer 120 may include a layer of HexWeb® HRP Flex-Core® available from Hexcel Corporation. The open-cell matrix layer also may include a perforated septum 906 like that shown in FIG. 6. With reference to FIG. 13, one or more non-perforated layers 124 may be attached on the rear surface of the open-cell matrix 120 by a suitable adhesive or adhesive layer 80, 180. The full openings 30 in the heater assembly 10, 100 provide passageways between the exterior of the heater device 10, 100 and the cells 122 of the open-cell matrix 120. Such a construction can provide substantial absorption of acoustic energy by creating Helmholtz resonance. Accordingly, such a structure 200, 300 is particularly suited for use on a nacelle inlet lip to attenuate engine fan noise, and to provide ice protection at the nacelle inlet.

The bus strips 40, 140, 142 of the heater 10, 100 are connected to a suitable power source, and operation of each resistance heating element 50, 150, 152 or combination of heating elements 50, 150, 152 is controlled by a suitable control device as is known in the art. Heat dissipated from the conductive layers 50, 150, 152 of the composite heater 10, 100 can effectively minimize ice accumulation on the associated surface of the aircraft, or can melt or cause the delamination of ice that accumulates on the aircraft surface.

As shown in FIGS. 17A-18B, the outermost surface of an aircraft surface structure that incorporates a composite heater 10, 100 according to the invention may include a durable, acoustically permeable erosion layer 35, 135. In a preferred embodiment, the erosion layer 35, 135 is a micro-perforated titanium foil. For example, the erosion layer 35, 135 may be a 0.2 mm thick titanium alloy foil having a plurality of spaced openings that are about 0.25 mm in diameter, and are spaced apart by about 0.5 mm. The erosion shield 35, 135 shields the composite structure 200, 300 from erosion and damage during service, and provides a substantially smooth aerodynamic outer surface to the structure. The micro-perforations in the erosion layer 35, 135 permit at least some sound waves to pass through the outer surface structure 200, 300, travel through the openings 30 in the underlying composite heater 10, 100, and to enter the open cells 122 of the open-cell layer 120. Alternatively, the erosion shield 35, 135 may include a perforated portion or portions that coincide with an acoustically treated section or sections of the aircraft surface structure, and a non-perforated portion or portions that coincide with a non-acoustically treated section or sections of the structure. In addition, a layer of non-woven scrim cloth 37, 137 may be sandwiched between the composite heater 10, 100 and the erosion layer 35, 135 as shown in FIGS. 17A-18B to further enhance the noise attenuation properties of the structure 200, 300.

Figure 23:
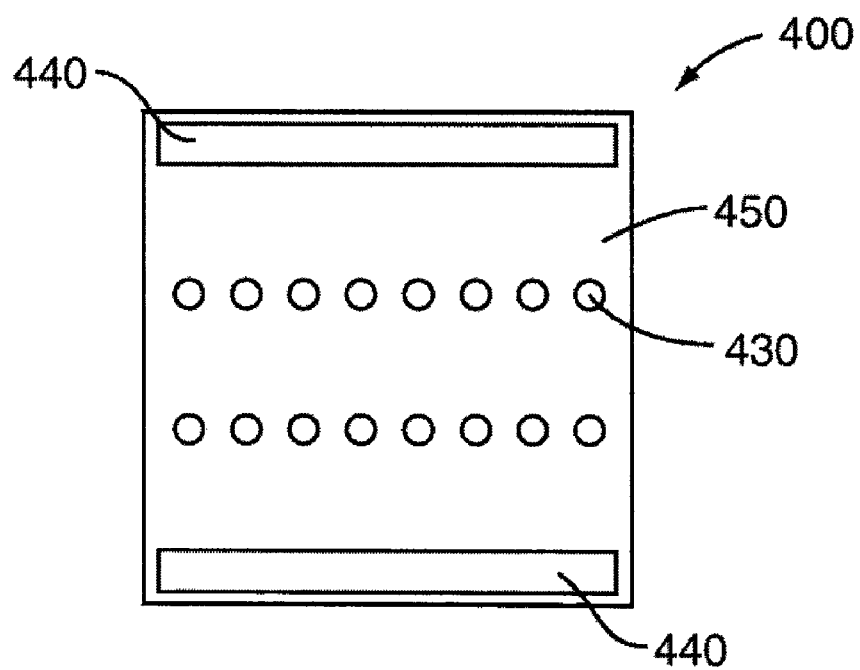
FIG. 23 is a plan view of one embodiment of a composite heater element according to the invention.

As described above, the conductive layers forming the resistance heating elements 50, 150, 152 may be constructed of a woven or unidirectional pre-impregnated fabric or tape including threads containing electrically conductive graphite fibers or another suitable conductive component. As described above, and as shown in FIG. 23, the electrical resistance of a sheet of electrically conductive fabric 450 can be increased by introducing a plurality of spaced openings 430 through the fabric 450. The spaced openings 430 create discontinuities in at least some of the woven threads, thereby interrupting the flow of electrical current through the affected threads when a voltage is applied between the bus strips 440. This interruption of current flow forces an electrical current to seek a more circuitous, less direct conductive path between the bus strips 440, thereby generating resistance heating in the conductive fabric 450.

Figure 24:
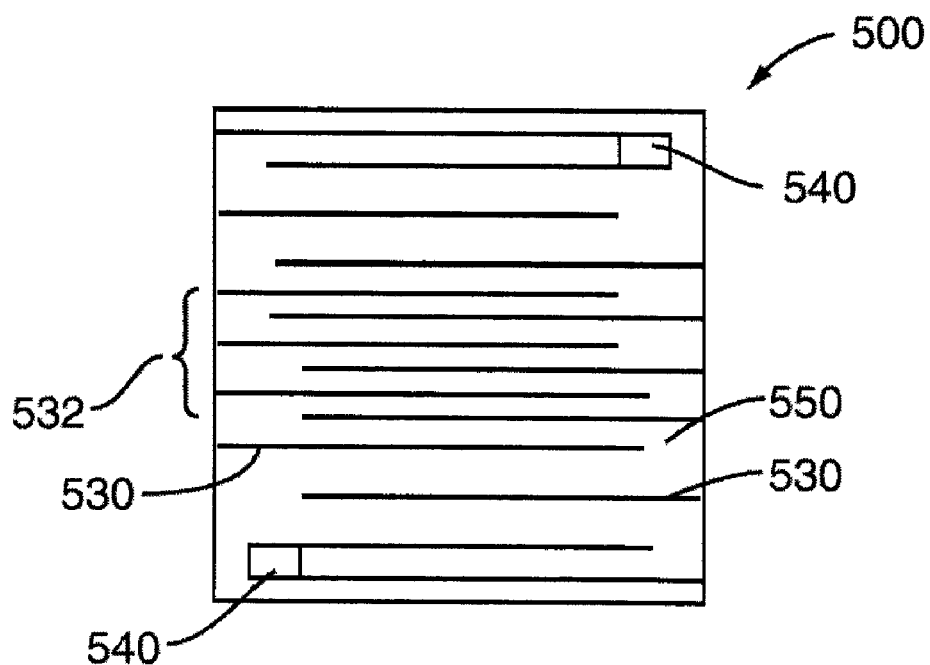
FIG. 24 is a plan view of another embodiment of a composite heater element according to the invention.
Figure 25:
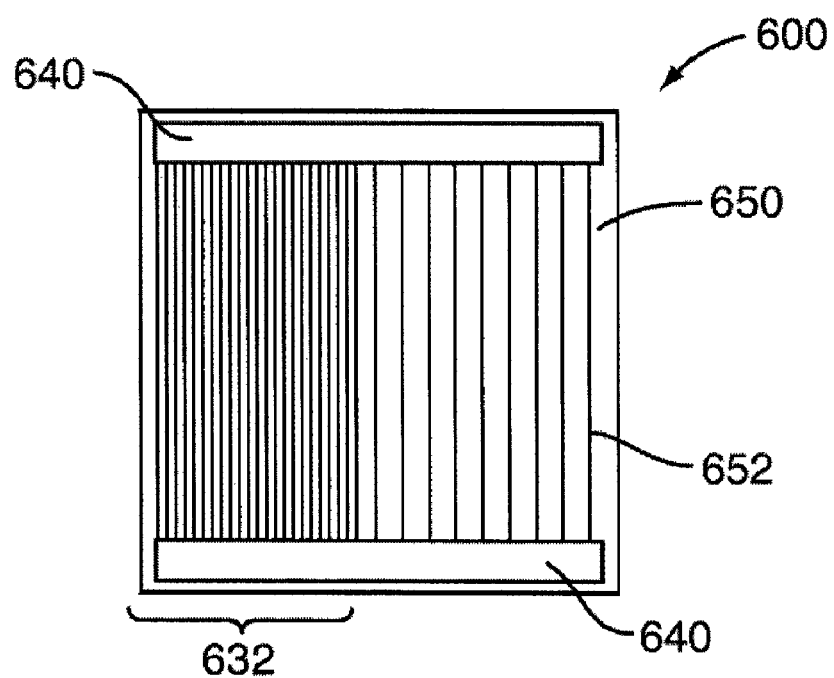
FIG. 25 is a plan view of a further embodiment of a composite heater element according to the invention.

Spaced, open perforations 430 are desirable when a composite heater 10, 100 according to the invention is incorporated into a composite aircraft surface structure 200, 300 like that shown in FIG. 12 that attenuates aircraft noise. Other types of discontinuities in an electrically conductive woven composite fabric also may be used to provide a desired rate of resistance heating from the fabric. As shown in FIG. 24, for example, a plurality of spaced slits 530 may be provided in a woven conductive sheet 550. Like the spaced perforations 430 discussed above, the slits 530 increase the effective electrical resistance to current flow between opposed bus strips 540 when an electric potential is applied between the bus strips 540. As shown FIG. 24, the spacing of slits 530 in woven fabric 550 can be varied to provide varying local electrical resistances across the extent of the woven fabric 550. For example, parallel slits 530 may be closely grouped together in a local region 532 to create an area of relatively high electrical resistivity. This region 532 forms a "hot spot" where the rate of dissipated resistance heating is greater than other areas of the fabric having more widely spaced slits 530. Such a "hot spot" 532 may be desirable along a forward-most portion of a leading edge of an aircraft surface structure, for example, which is susceptible to ice accumulation. Accordingly, the unevenly spaced slits 530 create at least one locally discontinuous property in the weave pattern The invention also includes a composite heater structure including a fabric having a plurality of conductive threads, but without openings such as holes, perforations, slits, or other such discontinuities. As shown in FIG. 25, a composite heater structure 600 according to the invention can include a woven fabric 650 wherein the conductive threads 652 essentially extend in a single direction. The balance of threads forming the woven fabric structure 650 may be non-conductive threads, such as low dielectric glass threads, for example. In the embodiment shown in FIG. 25, conductive threads 652 extend in a warp direction between two opposed bus strips 640. The parallel conductive threads 652 may be equally spaced, or the thread spacing may be closer in one or more regions 632 of the fabric 650 to create different effective local electrical resistances in different portions of the fabric 650. In the embodiment of a composite heater 600 shown in FIG. 25, for example, the effective electrical resistance in that portion 632 of the woven fabric 650 having more closely spaced conductive threads 652 is less than the local electrical resistance in that portion of the fabric 650 having more widely spaced conductive threads 652. Accordingly, when an electrical voltage is applied across opposed bus strips 640, the resistance heating generated from region 632 is less than the heating produced where the conductive threads 632 are more widely spaced. Accordingly, the arrangement of the conductive threads 632 creates at least one locally discontinuous property in the weave pattern.

Figure 26:
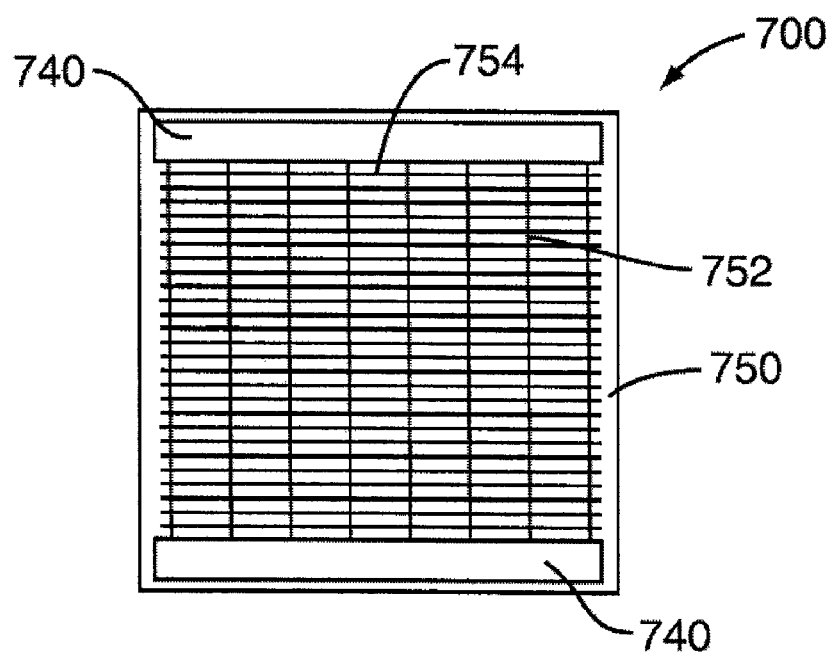
FIG. 26 is a plan view of another embodiment of a composite heater element according to the invention.

The invention also includes a composite heater apparatus 700 as shown in FIG. 26. In this embodiment, the heater 700 includes a sheet of woven fabric 750 including a first plurality of conductive threads 752 extending in a warp direction, for example, and a second plurality of conductive threads 754 extending in a fill direction. As shown in FIG. 26, the spacing (threads per inch) of warp conductive threads 752 in the weave pattern is greater than the spacing (threads per inch) of conductive threads 754 extending in the fill direction. The balance of the weave pattern of the woven fabric 750 includes non-conductive threads, such as glass threads, for example. Because the fabric 750 includes fewer possible conductive paths for current than a composite fabric sheet woven entirely of conductive warp and fill threads 752, 754, the effective electrical resistance of the woven fabric sheet 750 is greater than the resistance of a composite fabric sheet woven entirely of conductive threads 752, 754. Accordingly, when an electric voltage is applied across the opposed bus strips 740, a greater amount of heat is dissipated from the woven sheet 750 than would result if the woven sheet were constructed entirely of conductive threads 752, 754.

The above description of various embodiments of the invention is intended to describe and illustrate various aspects of the invention, and is not intended to limit the invention thereto. Persons of ordinary skill in the art will understand that certain modifications may be made to the described embodiments without departing from the invention. All such modifications are intended to be within the scope of the appended claims.

What is claimed is:

1. An acoustically treated aircraft engine nacelle inlet lip, comprising:
   (a) an acoustic cellular core arranged along an inner barrel portion of the inlet lip, the acoustic core comprising a laminated composite outer skin and an inner skin; and
   (b) an erosion shield arranged over at least a portion of the laminated composite outer skin, and overlying at least a portion of the acoustic core;
   (c) wherein the laminated composite outer skin has at least one electrically conductive heater layer disposed therein;
   (d) wherein the laminated composite outer skin includes a first set of openings extending therethrough, the first set of openings communicating with the acoustic cellular core; and
   (e) wherein the erosion shield includes a second set of openings extending therethrough, the second set of openings communicating with said first set of openings.

2. A nacelle inlet lip according to claim 1, wherein the erosion shield has a percent open area between about 5 percent and about 10 percent, and the composite outer skin has a percentage of open area between about 20 percent and about 40 percent.

3. A nacelle inlet lip according to claim 1, wherein the erosion shield comprises one of an aluminum sheet and a stainless steel screen.

4. A nacelle inlet lip according to claim 1, wherein the erosion shield comprises a titanium alloy and the second set of openings have a hole density of about 2,800 to 3,300 holes/cm$^2$.

5. A nacelle inlet lip in accordance with claim 1, and further comprising a lightning shield secured to an outer barrel portion of the composite outer skin, the lightning shield being in non-overlapping arrangement with the erosion shield.

6. A nacelle inlet lip according to claim 1, wherein the inlet lip comprises a parting strip heater formed at a leading edge portion thereof.

7. A nacelle inlet lip in according to claim 1, wherein the acoustic core is arranged along the inner barrel portion of the inlet lip, and does not extend past a highlight portion of the inlet lip.

8. A nacelle inlet lip according to claim 1, wherein the acoustic core is a double-degree-of-freedom-type acoustic core.

9. A nacelle inlet lip according to claim 1, and further comprising a structural cellular core between at least portions of the composite outer skin and the composite inner skin.

10. A nacelle inlet lip according to claim 9, wherein the structural cellular core extends along at least a portion of a leading portion of the outer skin.

11. A nacelle inlet lip according to claim 9, wherein the structural cellular core is spaced apart from the acoustic cellular core by a structural foam portion between the laminated composite outer skin and the laminated composite inner skin.

12. A nacelle inlet lip according to claim 1, and further comprising a bulkhead connecting an inner barrel side of the inlet lip to an outer barrel side of the inlet lip, thereby forming a duct within the inlet lip.

13. A nacelle inlet lip according to claim 1, and further comprising means for attaching the inlet lip to a nacelle body.

14. A nacelle inlet lip according to claim 1, wherein a first axial length of an outer barrel portion of the composite outer skin is more than twice as great as a second axial length of an inner barrel portion of the composite outer skin.

15. A nacelle inlet lip according to claim 1, wherein the inner skin has a laminated composite construction, and wherein an inner barrel portion of the composite inner skin includes a doubler portion proximate an aft edge.

16. A nacelle inlet lip according to claim 9, wherein the inner skin has a laminated composite construction, and includes a closeout section forming a transition between the inner skin and an edge of the structural cellular core.

17. A nacelle inlet lip comprising:
   (a) an acoustic cellular core;
   (b) a plurality of composite outer skin layers covering an outer face of the acoustic cellular core; and
   (c) at least one electrically conductive heater element disposed between at least two of the composite outer skin layers;
   (d) wherein at least some of the outer skin layers and the heater element include a plurality of openings extending therethrough, the openings forming acoustic pathways to the acoustic cellular core.

18. A nacelle inlet lip according to claim 17 wherein the electrically conductive heater element comprises a composite graphite fabric.

19. A nacelle inlet lip according to claim 17 comprising a plurality of spaced electrically conductive heater elements disposed between at least two of the composite outer skin layers.

20. A nacelle inlet lip according to claim 17 comprising a first electrically conductive heater element disposed between a first composite outer skin layer and a second composite outer skin layer, and a second electrically conductive heater element disposed between two outer skin layers, at least one of which is not the first or second outer skin layer.

21. A nacelle inlet lip according to claim 17, wherein a first axial length of an outer barrel portion of the plurality of composite outer skin layers is more than twice as great as a second axial length of an inner barrel portion of the plurality of composite outer skin layers.

22. A nacelle inlet lip comprising:
   (a) an acoustic cellular core;
   (b) an outer skin layer including a plurality of composite outer skin layers, and covering an outer face of the acoustic cellular core;
   (c) means for heating at least a portion of the outer skin layer, the heating means being disposed between at least two of the composite outer skin layers; and
   (d) means for permitting sound waves to pass through at least a portion of the outer skin and the heating means to the acoustic cellular core.

23. A nacelle inlet lip according to claim 22 wherein the heating means comprises an electrically conductive composite fabric.

24. A nacelle inlet lip according to claim 22 wherein the means for permitting passage of sound waves comprises a plurality of openings extending through at least a portion of the outer skin and at least a portion of the heating means.

25. A nacelle inlet lip according to claim 22, wherein a first axial length of an outer barrel portion of the composite outer skin layer is more than twice as great as a second axial length of an inner barrel portion of the composite outer skin layer.

* * * * *